(12) United States Patent
Qian et al.

(10) Patent No.: US 10,887,065 B2
(45) Date of Patent: Jan. 5, 2021

(54) ELECTRONIC DEVICE THAT DETERMINES AN UPLINK PILOT SEQUENCE, AND METHOD THEREFOR

(71) Applicant: Sony Corporation, Tokyo (JP)

(72) Inventors: Chen Qian, Beijing (CN); Jinhui Chen, Beijing (CN); Zhaocheng Wang, Beijing (CN); Chen Sun, Beijing (CN)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 16/446,624

(22) Filed: Jun. 20, 2019

(65) Prior Publication Data
US 2019/0305907 A1     Oct. 3, 2019

Related U.S. Application Data

(63) Continuation of application No. 15/327,585, filed as application No. PCT/CN2015/076277 on Apr. 10, 2015, now Pat. No. 10,374,766.

(30) Foreign Application Priority Data

Aug. 7, 2014   (CN) .......................... 2014 1 0386345

(51) Int. Cl.
*H04W 4/00*   (2018.01)
*H04L 5/00*   (2006.01)
(Continued)

(52) U.S. Cl.
CPC .......... *H04L 5/0048* (2013.01); *H04L 5/0023* (2013.01); *H04L 5/0051* (2013.01);
(Continued)

(58) Field of Classification Search
CPC ... H04L 5/0048; H04L 5/0023; H04L 5/0051; H04L 5/0069; H04L 5/0073; H04W 72/0413; H04W 64/006
See application file for complete search history.

(56) References Cited

U.S. PATENT DOCUMENTS

| | | | | |
|---|---|---|---|---|
| 5,280,472 A | * | 1/1994 | Gilhousen | .............. H01Q 21/29 370/335 |
| 7,995,614 B2 | * | 8/2011 | Ogawa | ................ H04J 13/0062 370/470 |

(Continued)

FOREIGN PATENT DOCUMENTS

| | | |
|---|---|---|
| CN | 101192875 A | 6/2008 |
| CN | 101945395 A | 1/2011 |

(Continued)

OTHER PUBLICATIONS

International Search Report dated Jun. 29, 2015 in PCT/CN2015/076277 filed Apr. 10, 2015.

*Primary Examiner* — Maharishi V Khirodhar
(74) *Attorney, Agent, or Firm* — Xsensus, LLP

(57) ABSTRACT

A method for an electronic device includes determining, based on indicating information of an uplink pilot sequence allocated by a base station, an uplink pilot sequence, transmitting the uplink pilot sequence, and determining a change in a geographical location of the electronic device. In a case that the geographical locations of the electronic device before and after changing correspond to different cell partitions, the uplink pilot sequence is updated based on the indicating information allocated by the base station, and the updated uplink pilot sequence corresponds to the cell partition corresponding to the geographical location of the electronic device after changing. The uplink pilot sequence is for the base station estimating a channel between the base station and the electronic device, and filtering based on the geographical location of the electronic device during the channel estimation, to obtain a channel estimation result matching the electronic device.

21 Claims, 12 Drawing Sheets

(51) Int. Cl.
*H04W 72/04* (2009.01)
*H04W 64/00* (2009.01)

(52) U.S. Cl.
CPC .......... *H04L 5/0069* (2013.01); *H04L 5/0073* (2013.01); *H04W 72/0413* (2013.01); *H04W 64/006* (2013.01)

(56) References Cited

U.S. PATENT DOCUMENTS

| | | | |
|---|---|---|---|
| 10,374,766 B2* | 8/2019 | Qian | H04L 5/0048 |
| 2002/0045443 A1 | 4/2002 | Hunzinger | |
| 2006/0209973 A1* | 9/2006 | Gorokhov | H04L 5/0048 |
| | | | 375/260 |
| 2006/0291371 A1* | 12/2006 | Sutivong | H04L 5/0069 |
| | | | 370/208 |
| 2009/0147668 A1 | 6/2009 | Manakkal et al. | |
| 2009/0225701 A1 | 9/2009 | Kwon et al. | |
| 2009/0296563 A1 | 12/2009 | Kishiyama et al. | |
| 2010/0054184 A1 | 3/2010 | Kishiyama et al. | |
| 2010/0061333 A1 | 3/2010 | Marsh et al. | |
| 2011/0075617 A1 | 3/2011 | Ashikhmin et al. | |
| 2011/0189986 A1 | 8/2011 | Tinnakomsrisuphap et al. | |
| 2012/0113953 A1 | 5/2012 | Papadopoulos et al. | |
| 2012/0202558 A1 | 8/2012 | Hedberg et al. | |
| 2013/0315111 A1 | 11/2013 | Ashikhmin et al. | |
| 2013/0336224 A1* | 12/2013 | Davydov | H04B 7/2656 |
| | | | 370/328 |
| 2017/0187504 A1* | 6/2017 | Qian | H04L 5/0048 |
| 2018/0006783 A1 | 1/2018 | Zhu et al. | |

FOREIGN PATENT DOCUMENTS

| | | |
|---|---|---|
| CN | 102142918 A | 8/2011 |
| CN | 103546264 A | 1/2014 |
| WO | 2011/041132 A2 | 4/2011 |
| WO | 2015/169358 A1 | 11/2015 |

* cited by examiner

ELECTRONIC DEVICE THAT DETERMINES AN UPLINK PILOT SEQUENCE, AND METHOD THEREFOR

CROSS-REFERENCE TO RELATED APPLICATIONS

This application is a continuation of U.S. application Ser. No. 15/327,585, filed Jan. 19, 2017, which is based on PCT filing PCT/CN2015/076277, filed Apr. 10, 2015, and claims priority to CN 201410386345.5, filed Aug. 7, 2014, the entire contents of each are incorporated herein by reference.

FIELD OF THE INVENTION

The embodiments of the present disclosure generally relates to the field of wireless communication, and particularly to an apparatus and a method for wireless communication, an electronic device and a method for the electronic device. More particularly, the embodiments of the present disclosure relate to pilot allocation and channel estimation techniques in a massive Multiple Input Multiple Output (MIMO) communication system.

BACKGROUND OF THE INVENTION

A massive MIMO (massive MIMO) system has attracted wide attention in academics and industry in recent years. The theoretical research shows the massive MIMO system can significantly improve spectrum efficiency and energy efficiency simultaneously by a simple linear algorithm such as the zero-forcing algorithm, the minimum mean-square error algorithm and the like. Therefore, the massive MIMO system is likely to be adopted as a key technique in the next-generation communication standard.

However, for example, performance of the massive MIMO system in multi-cell time division multiplexing scenario is limited due to a problem of pilot pollution. Specifically, since the length of a pilot is limited to a coherent length of a channel, the number of orthogonal pilots is limited, and it is inevitable that a pilot is reused among different cells. In this case, pilot signals transmitted by the users, located in different cells, which use a same pilot sequence or pilot sequences which are incomplete orthogonal may be received by a same base station. However, the base station can not distinguish the pilot signals effectively, and thus channel estimation at the base station is disturbed. In a case that the base station adopts the disturbed channel estimation to detect uplink data, not only data transmitted by a user in the present cell is received, but also data transmitted from a user in another cell is received, which results in inter-cell interferences in the uplink. In a case that the base station adopts the disturbed channel estimation to generate a pre-coding matrix and transmit downlink data, the downlink data can be received not only by the user in the present cell, but also by the user in the another cell, which results in inter-cell interferences in the downlink interference.

The theoretical research shows that, although both the spectrum efficiency and energy efficiency of the massive MIMO system can be improved significantly, and an influence of the noise and a channel estimation error on the performance of the massive MIMO system is becoming smaller with the increase of the number of antennas in the base station, the inter-cell interferences caused by the pilot pollution can not be eliminated, which becomes one of limiting factors for the performance of the massive MIMO system.

The existing methods for alleviating the pilot pollution are difficult to be applied considering the current technical condition, and therefore, the pilot pollution is still one of the serious problems of the massive MIMO system in the actual application. In addition, the pilot pollution becomes worse with the continuous increase of the number of the users within the cell.

SUMMARY OF THE INVENTION

In the following, an overview of the present invention is given simply to provide basic understanding to some aspects of the present invention. It should be understood that this overview is not an exhaustive overview of the present invention. It is not intended to determine a critical part or an important part of the present invention, nor to limit the scope of the present invention. An object of the overview is only to give some concepts in a simplified manner, which serves as a preface of a more detailed description described later.

An apparatus for wireless communication is provided according to an aspect of the present disclosure, which includes: a location determining unit, configured to determine a cell partition corresponding to a geographical location of a communication device, each cell including multiple cell partitions; and a pilot determining unit, configured to determine an uplink pilot sequence corresponding to the cell partition as an uplink pilot sequence of the communication device.

A method for wireless communication is provided according to another aspect of the present disclosure, which includes: determining a cell partition corresponding to a geographical location of a communication device, each cell including multiple cell partitions; and determining an uplink pilot sequence corresponding to the cell partition as an uplink pilot sequence of the communication device.

An apparatus for wireless communication is further provided according to a further aspect of the present disclosure, which includes: a dividing unit, configured to divide each cell of multiple cells into multiple cell partitions; and a pilot pattern generating unit, configured to correspond multiple uplink pilot sequences with the cell partitions to generate a pilot pattern, where the pilot pattern is generated based on pilot interferences between different cell partitions which are corresponding to a same uplink pilot sequence.

A method for wireless communication is provided according to another aspect of the present disclosure, which includes: dividing each cell of multiple cells into multiple cell partitions; and corresponding multiple uplink pilot sequences with the cell partitions to generate a pilot pattern, where the pilot pattern is generated based on pilot interferences between different cell partitions which are corresponding to a same uplink pilot sequence.

An electronic device is provided according to another aspect of the present disclosure, which includes: an uplink pilot sequence determining unit, configured to determine, based on indicating information of an uplink pilot sequence allocated by a base station, an uplink pilot sequence of the electronic device; and a location determining unit, configured to determine a change in a geographical location of the electronic device, where in a case that the geographical locations of the electronic device before and after changing correspond to different cell partitions, the uplink pilot sequence determining unit updates, based on the indicating information of the uplink pilot sequence allocated by the base station, the uplink pilot sequence of the electronic device, the updated uplink pilot sequence being corresponding to the cell partition corresponding to the geographical location of the electronic device after changing.

A method for an electronic device is provided according to another aspect of the present disclosure, which includes: determining, based on indicating information of an uplink pilot sequence allocated by a base station, an uplink pilot sequence of the electronic device; and determining a change in a geographical location of the electronic device, where in a case that the geographical locations of the electronic device before and after changing correspond to different cell partitions, the uplink pilot sequence of the electronic device is updated based on the indicating information of the uplink pilot sequence allocated by the base station, the updated uplink pilot sequence being corresponding to the cell partition corresponding to the geographical location of the electronic device after changing.

An apparatus for wireless communication is provided according to another aspect of the present disclosure, which includes: a pilot determining unit, configured to determine a first uplink pilot sequence for a first communication device; and a channel estimation unit, configured to perform, based on a received signal carrying the first uplink pilot sequence, channel estimation on the first communication device, where the channel estimation unit performs, based on a geographical location of the first communication device, filtering during the channel estimation, to obtain a channel estimation result matching the first communication device.

A method for wireless communication is provided according to an aspect of the present disclosure, which includes: determining a first uplink pilot sequence for a first communication device; and performing, based on a received signal carrying the first uplink pilot sequence, channel estimation on the first communication device, where filtering is performed during the channel estimation based on a geographical location of the first communication device, to obtain a channel estimation result matching the first communication device.

Computer program codes and a computer program product for implementing the method for wireless communication and the method for the electronic device described above, and a computer-readable storage medium on which the computer program codes for implementing the method for wireless communication and the method for the electronic device described above are recorded are further provided according to other aspects of the present disclosure.

In the apparatus and method for wireless communication according to the present disclosure, the uplink pilot sequence is allocated and the channel estimation is performed based on the location of the communication device, thereby significantly reducing inter-interferences caused by pilot pollution, and improving overall performance of the system. In addition, spatial multiplexing for the uplink pilot sequences can be realized by the apparatus and the method for the wireless communication according to the present disclosure. A same uplink pilot sequence or a correlated uplink pilot sequence can be used even for communication devices in a same cell, thereby increasing the number of communication devices which can be supported.

These and other advantages of the present invention will be more apparent by illustrating in detail a preferred embodiment of the present invention in conjunction with accompanying drawings below.

BRIEF DESCRIPTION OF THE DRAWINGS

To further set forth the above and other advantages and features of the present invention, detailed description will be made in the following taken in conjunction with accompanying drawings in which identical or like reference signs designate identical or like components. The accompanying drawings, together with the detailed description below, are incorporated into and form a part of the specification. It should be noted that the accompanying drawings only illustrate, by way of example, typical embodiments of the present invention and should not be construed as a limitation to the scope of the invention. In the accompanying drawings.

DETAILED DESCRIPTION OF THE EMBODIMENTS

An exemplary embodiment of the present invention will be described hereinafter in conjunction with the accompanying drawings. For the purpose of conciseness and clarity, not all features of an embodiment are described in this specification. However, it should be understood that multiple decisions specific to the embodiment have to be made in a process of developing any such embodiment to realize a particular object of a developer, for example, conforming to those constraints related to a system and a business, and these constraints may change as the embodiments differs. Furthermore, it should also be understood that although the development work may be very complicated and time-consuming, for those skilled in the art benefiting from the present disclosure, such development work is only a routine task.

Here, it should also be noted that in order to avoid obscuring the present invention due to unnecessary details, only a device structure and/or processing steps closely related to the solution according to the present invention are illustrated in the accompanying drawing, and other details having little relationship to the present invention are omitted.

First Embodiment

Figure 1:
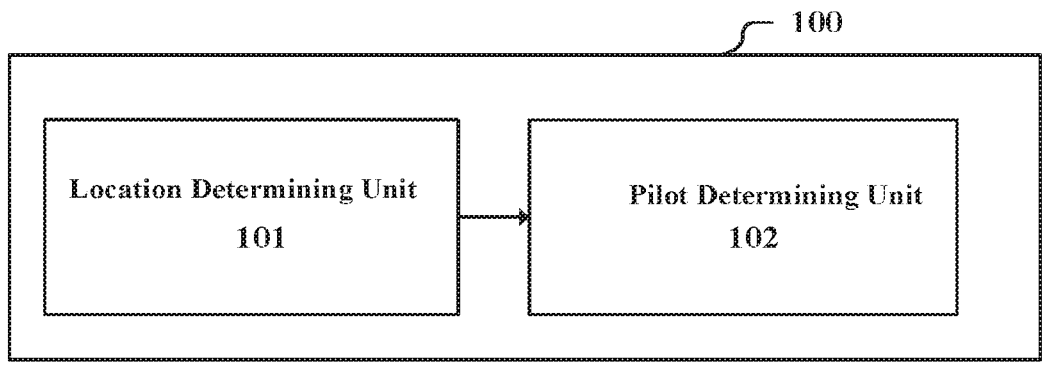
FIG. 1 is a structural block diagram showing an apparatus for wireless communication according to an embodiment of the present disclosure.

FIG. 1 shows a structural block diagram of an apparatus 100 for wireless communication according to an embodiment of the present disclosure. The apparatus 100 includes: a location determining unit 101, configured to determine a cell partition corresponding to a geographical location of a communication device, each cell including multiple cell partitions; and a pilot determining unit 102, configured to determine an uplink pilot sequence corresponding to the cell partition as an uplink pilot sequence of the communication device.

Specifically, the apparatus 100 is configured to for example allocate an uplink pilot sequence for a communication device, so that the communication device can perform uplink data transmission using the allocated uplink pilot sequence. The apparatus 100 may be applied in for example an MIMO communication system. As an example, the apparatus 100 may be located at each access point or on a base station side, and is configured to determine the uplink pilot sequence for the communication device within its service range. In general, a communication link from a service node to the communication device is referred to as a downlink, and a communication link from the communication device to the service node is referred to as an uplink. As described in the example above, the service node in the present disclosure is configured to allocate a pilot sequence to a user equipment, the pilot sequence being transmitted to the service node from the user equipment. Specifically, the pilot determining unit 102 may determine multiple uplink pilot sequences, i.e. a group of uplink pilot sequences, and the uplink pilot sequences in the group are orthogonal to each other.

The communication device described here may be a user equipment such as a mobile terminal, a vehicle, an intelligent wearable device an so on. It should be noted that the communication device in the present disclosure may also be an infrastructure for providing a service, such as a small cell base station. In a case that the communication device is the small cell base station, the apparatus 100 for example located in a macro base station determines a pilot sequence for the small cell base station as described above. Here, for example, a communication link from the macro base station to the small cell base station is regarded as a downlink in the present disclosure, and a communication link from the small cell base station to the macro base station is regarded as an uplink. In other words, the present disclosure is not limited to communication entities corresponding to a traditional uplink and a traditional downlink. In a case that a first communication device is to determine a channel state from a second communication device within a signal coverage range thereof to the first communication device so as to allocate a pilot to the second communication device, the present disclosure is applied considering that the communication link from the second communication device to the first communication device is the uplink.

In the embodiment, each cell is divided into multiple cell partitions. The cell partition here may be a traditional sector partition, or may be a partition, which is different in shape and divided according to another principle. The specific dividing manner will be described in detail later.

The location determining unit 101 determines a cell partition where a geographical location of the communication device is located, and provides information on the cell partition to the pilot determining unit 102, so that the pilot determining unit 102 can determine an uplink pilot sequence corresponding to the cell partition as an uplink pilot sequence to be used by the communication device.

In the embodiment, after the location determining unit 101 determines that the geographical location of the communication device changes into another cell partition, the pilot determining unit 102 determines an uplink pilot sequence corresponding to the changed cell partition as the uplink pilot sequence of the communication device. In other words, the apparatus 100 can determine the uplink pilot sequence for the communication device dynamically. Specifically, the location determining unit 101 may determine the geographical location of the communication device periodically to determine whether the geographical location changes into another cell partition. Alternatively, the location determining unit 101 may perform the determination in a case that a change in the geographical location of the communication device exceeds a certain extent. In some examples, the location determining unit 101 detects the geographical location of the communication device actively to perform the determination. In other examples, the location determining unit 101 determines the geographical location of the communication device by a geographical location report from the communication device for example.

Specifically, the geographical location of the communication device can be characterized by at least one of: an angle of arrival direction of the communication device; an angle of arrival direction and a distance from the communication device to the apparatus 100; geographical coordinates/geodetic coordinates such as longitude and latitude of the communication device; and an ID of a small cell where the communication device is located. Specifically, for example, in a case that the location determining unit 101 detects the geographical location of the communication device actively, the geographical location of the communication device may be characterized by for example the angle of arrival direction or the angle of arrival direction and the distance from the communication device to the apparatus 100. For example, in a case that the location determining unit 101 determines based on the geographical location report of the communication device, the geographical location of the communication device can be characterized by for example the longitude and latitude of the communication device or the ID of the small cell where the communication device is located.

Figure 2:
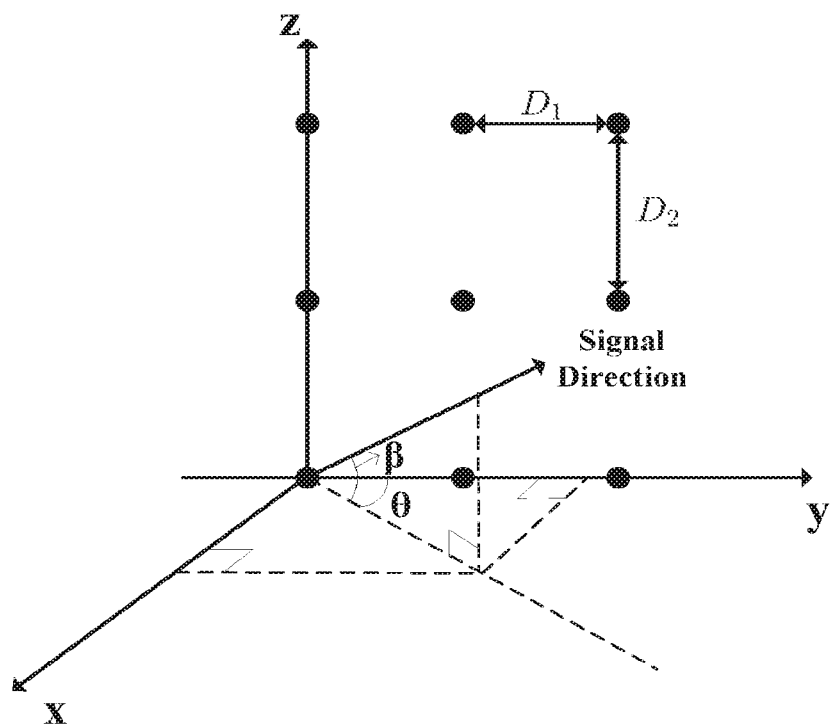
FIG. 2 is a schematic diagram showing an example of a two-dimensional antenna array.

In an actual communication system, a one-dimensional evenly spaced linear antenna array or a two-dimensional antenna array can be used by an access point. FIG. 2 shows an example of the two-dimensional antenna array, in which, a black spot represents an arranged antenna, $D_1$ and $D_2$ represent the antenna interval in a horizontal direction and in a vertical direction, respectively, and a solid line with an arrow represents a direction for receiving a signal as an example. FIG. 2 only shows nine antennas, however, it is only exemplary, and the size of the antennas is not limited thereto. In addition, in a case that one-dimensional array is used, antennas on the y-axis can just be used.

Specifically, angle θ is an angle of arrival in the horizontal direction, and angle β is an angle of arrival in the vertical direction. Since that the height of the antenna is known, the angle β can also reflect a distance from the communication device to the apparatus 100. In an example of the present disclosure, the two-dimensional antenna array is configured for the access point. The location determining unit 100 provided at the access point side determines an angle θ of arrival in the horizontal direction and an angle β of arrival in the vertical direction of a signal received from the communication device, and determines and characterizes the geographical location (including information on the direction and the distance) of the communication device based on the angle θ of arrival in the horizontal direction and the angle β of arrival in the vertical direction. In another example of the present disclosure, the one-dimensional antenna array is configured for the access point. The location determining unit 101 provided at the access point side determines an angle θ of arrival in the horizontal direction of a signal received from the communication device, and determines and characterizes the geographical location (including information on a direction) of the communication device based on the angle θ of arrival in the horizontal direction. In addition, the access point provided with the one-dimensional antenna array can further estimate, based on timing advance of the communication device or path loss of the signal and the like, a distance from the communication device to the access point, and characterize the geographical location of the communication device according to the angle θ and the estimated distance.

In addition, for example, in a case that the geographical location of the communication device is determined based on the geographical location report of the communication device, the geographical location of the communication device can also be represented by the geodetic coordinates such as longitude and latitude or the ID of the small cell where the communication device is located. Specifically, the communication device for example reports information on the longitude and latitude determined by a GPS module thereof to the apparatus 100, for use by the location determining unit 101 to determine. In addition, for example, the access point where the apparatus 100 is located is a macro base station, and information on small cells having a relatively small coverage range deployed within a coverage range of the macro base station is known in advance to the macro base station or can be queried for example via a database by the macro base station. In this case, an ID of the small cell may reflect the geographical location of the small cell within the range of the macro cell. In a case that the communication device is located within the coverage range of the small cell, the communication device can receive the ID of the small cell broadcasted by the small cell, and feed back the ID of the small cell to the macro cell. The location determining unit 101 can acquire the location of the communication device based on the ID of the small cell and deployment information of the small cell known to the macro cell in advance or by querying the database. In a case that the apparatus 100 is located outside of the macro base station, the apparatus 100 can also acquire the location of the communication device from the macro cell via a communication interface with the macro base station.

Second Embodiment

Figure 3:
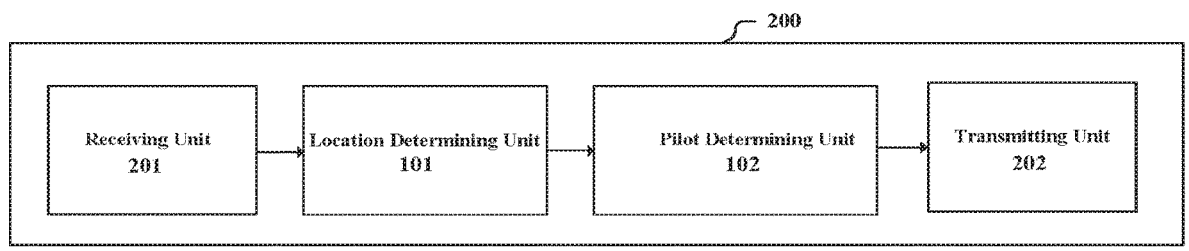
FIG. 3 is a structural block diagram showing an apparatus for wireless communication according to another embodiment of the present disclosure.

FIG. 3 is a structural block diagram showing an apparatus 200 for wireless communication according to another embodiment of the present disclosure. In addition to components the same as those in FIG. 1, the apparatus 200 further includes: a receiving unit 201, configured to receive information indicating the geographical location transmitted by the communication device; and a transmitting unit 202, configured to transmit indicating information of the uplink pilot sequence to the communication device via a dedicated control signaling, to allocate the uplink pilot sequence to the communication device.

The information indicating the geographical location described here may be explicit location information (for example GPS positioning information), or may be a normal signal implicitly reflecting the location information. The apparatus 200 may obtain information such as an angle of arrival direction, timing advance, path loss or the like based on the normal signal, and deduce the geographical location of the communication device coarsely.

After the pilot determining unit 102 determines the uplink pilot sequence of the communication device, the transmitting unit 202 transmits the indicating information corresponding to the uplink pilot sequence to the communication device. The communication device determines the uplink pilot sequence to be used based on the received indicating information. The indicating information may be an index representing the uplink pilot sequence, or may be the uplink pilot sequence itself. As an example, the uplink pilot sequence may be a reference sequence for a Sounding Reference Signal (SRS) or a Demodulation Reference Signal in the LTE standard.

Specifically, the transmitting unit 202 may transmit the indicating information described above via the dedicated control signaling (a high-layer signaling) such as a radio resource control (RRC) signaling in the LTE standard. Specifically, for example, the indicating information described above is included in the sounding reference signal uplink configuration information element (SoundingRS-UL-Config IE). More specifically, the indicating information is for example an SRS configuration index (SRS-ConfigIndex).

Alternatively, the communication device can also be notified of the uplink pilot sequence to be used in the following manner: a base station (or the apparatus 200) contains a geographical range of each cell partition and an uplink pilot sequence corresponding to the cell partition in broadcasting information, so as broadcast it to all users. Each of the users determines, based on a geographical location of itself and the received broadcasting information, a cell partition where the user is located and an uplink pilot sequence to be used. In this case, it is not necessary for the communication device to report its geographical location.

In addition, the receiving unit 201 may be further configured to receive pilot pattern information including a correspondence between each cell partition and an uplink pilot sequence of the cell partition from a central node. The pilot determining unit 102 is configured to determine an uplink pilot sequence of the communication device based on the pilot pattern information. In this case, the uplink pilot allocation for all cell partitions is managed uniformly by the central node. The receiving unit 201 can acquire the pilot pattern information from the central node periodically, or renewedly acquire the pilot pattern information only when the pilot pattern information is updated by the central node, or acquire the pilot pattern information in a combination of the two ways described above. The central node provides pilot pattern information on multiple cell partitions included in a cell for at least one cell. Preferably, the central node is a management device such as a server for managing multiple cells, for example, a server on a core network side or a super controller (SRC)/Cloud BB (basic band) in an unbounded network solution (for example, C-RAN). In another example, the receiving unit 201 may be further configured to receive uplink pilot sequence information of a cell partition of another cell adjacent to the cell partition where the communication device is located. The pilot determining unit 102 is configured to determine, based on the uplink pilot sequence information of the cell partition of another cell, the uplink pilot sequence corresponding to the cell partition where the communication device is located. Specifically, in a case that the apparatus is provided on the base station side, the receiving unit 201 interchanges the uplink pilot sequence information corresponding to the cell partition with an adjacent base station via for example an X2 interface. By taking the uplink pilot sequence information of the cell partitions of adjacent cells into consideration, the adjacent cell partitions can be prevented from using the same uplink pilot sequence as much as possible. By enabling adjacent cell partitions to correspond to different uplink pilot sequences, interferences caused by the pilot pollution can be reduced.

Third Embodiment

Figure 4:
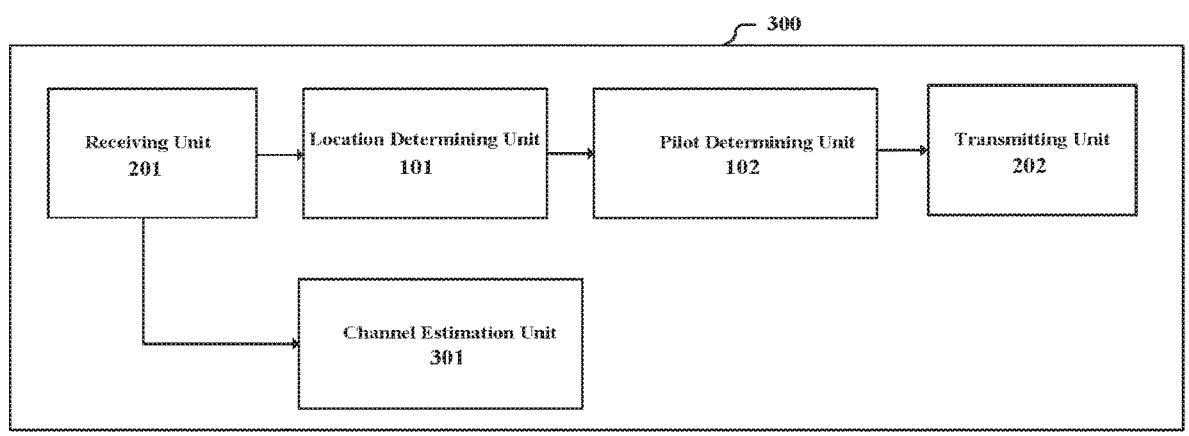
FIG. 4 is a structural block diagram showing an apparatus for wireless communication according to another embodiment of the present disclosure.

A structural block diagram of an apparatus 300 for wireless communication according to another embodiment of the present disclosure is described below with reference to FIG. 4. In addition to components described in FIG. 3, the apparatus 300 further include a channel estimation unit 301.

In the embodiment, adjacent cell partitions correspond to different uplink pilot sequences.

The receiving unit 201 is further configured to receive a signal carrying a first uplink pilot sequence, and the channel estimation unit 301 is configured to perform, based on the signal carrying the first uplink pilot sequence, channel estimation on a communication device to which the first uplink pilot sequence is allocated. Specifically, the channel estimation unit 301 performs, based on a geographical location of the communication device to which the first uplink pilot sequence is allocated, filtering during the channel estimation, to obtain a channel estimation result matching the communication device.

Specifically, since communication devices served by the base station at the same time and allocation of uplink pilot sequences among the communication devices are known to the base station, the base station can determine, based on the uplink pilot sequence information, which communication device transmits the pilot by itself, and the channel estimation unit 301 may perform filtering based on the geographical location of the communication device. An objective of the filtering during the channel estimation is to eliminate pollution from a same pilot transmitted by another communication device.

Figure 5:
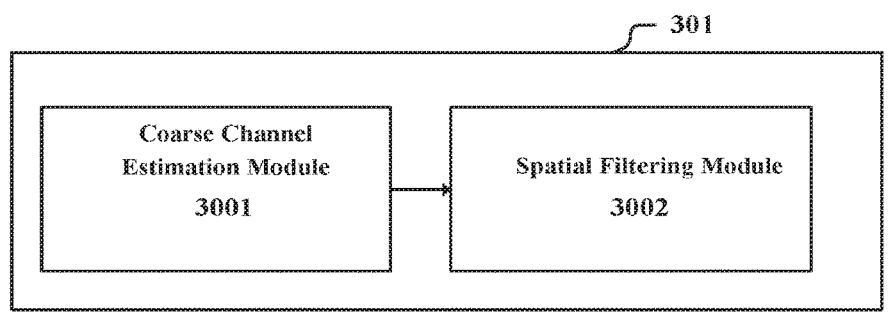
FIG. 5 is a structural block diagram showing a channel estimation module according to an embodiment of the present disclosure.

FIG. 5 is a structural block diagram showing an example of the channel estimation unit 301. The channel estimation unit 301 includes: a coarse channel estimation module 3001, configured to perform, based on the signal carrying the first uplink pilot sequence and the first uplink pilot sequence, coarse estimation on channel coefficients; and a spatial filtering module 3002, configured to perform, based on the geographical location of the communication device to which the first uplink pilot sequence is allocated, filtering on the coarse estimation for the channel coefficients.

Specifically, various known estimation ways can be used by the coarse channel estimation module 3001. Since the pilot determining unit 102 determines different uplink pilot sequences for adjacent cell partitions, different users which use the same pilot substantially would not have a same location parameter such as an angle of arrival direction or a distance from the user to the base station or the like. Practically, in order to ensure that different users which use the same pilot would not have a same location parameter, location parameters of different users which use the same pilot can be set to be different by special design. An example is given below in conjunction with FIG. 6, where each hexagon represents a cell, each cell is divided into 12 cell partitions, and each number labeled in each cell partition represents an index of a pilot sequence allocated to the cell. For example, an index of a pilot sequence of one cell partition within a cell 0 in the center is 2. In a case that the location parameter is an angle of arrival in the horizontal direction, and a range of the angle of arrival in the horizontal direction of a part of cell partitions within the cell 1 adjacent to the cell 0 is the same as that from the cell partition, the index of which is 2, to the base station of the cell 0, an index of the pilot sequence corresponding to the part of cell partitions (a part or all of the part thereof) within the cell 1 described above can be assigned an index value except 2 by special design, to avoid user interferences from another cell having the same location parameter.

In other words, the location parameter of the user within a specific cell partition is substantially limited within a certain range. Based on this, the spatial filtering module 3001 performs spatial filtering based on the geographical location of the communication device, thereby significantly reducing a mean-square error of the channel estimation.

In an example, the spatial filtering module 3002 may be configured to perform filtering by performing discrete Fourier transform on the coarse estimation for the channel coefficients and windowing a result of the transform.

An implementation of the coarse channel estimation module 3001 and the spatial filtering module 3002 is described below by a specific example. It should be understood that the implementation of the coarse channel estimation module 3001 and the spatial filtering module 3002 is not limited to the following description.

First, the coarse channel estimation module 3001 multiplies the signal carrying the first uplink pilot sequence with the first uplink pilot sequence, to obtain coarse estimation for the channel coefficients. Then, the spatial filtering module 3002 performs discrete Fourier transform on the coarse estimation for the channel coefficients, applies a rectangular window on a result of the transform, and finally performs inverse discrete Fourier transform on a signal obtained after applying the window, to obtain final estimation for the channel coefficient.

In an example, a one-dimensional evenly spaced linear antenna array is used for the access point, and the discrete Fourier transform performed is one-dimensional transform. A location of the rectangular window is determined based on a range of the angle of arrival direction of the communication device. For example, a minimum index $k_{min}$ and a maximum index $k_{max}$ of the rectangular window are determined according to formula (I) as follows.

$$\begin{cases} k_{min} = \left[ N - N\frac{D}{\lambda}\cos(\theta_{min}) \right] \\ k_{max} = \left[ N - N\frac{D}{\lambda}\cos(\theta_{max}) \right] \end{cases} \quad (1)$$

where $\theta_{min}$ and $\theta_{max}$ are a minimum angle of arrival direction and a maximum angle of arrival direction (angle of arrival in the horizontal direction) within a detection section, respectively, N is the number of points involved in the discrete Fourier transform and is generally greater than the number of antennas of the access point; D and $\lambda$ are an antenna space and a wavelength of received signal, respectively, [ ] represents a rounding operation.

Alternatively, the discrete Fourier transform may be not performed, and the coarse estimation for the channel coefficients is filtered directly by a filter as follows.

$$x(n) = \begin{cases} \dfrac{k_{max} - k_{min}}{N}, & n = 0 \\ \dfrac{1}{N} \dfrac{\exp\left\{j\frac{2\pi k_{min}}{N}n\right\} - \exp\left\{j\frac{2\pi k_{max}}{N}n\right\}}{1 - \exp\left\{j\frac{2\pi n}{N}\right\}}, & n = 1, \ldots, N-1 \end{cases} \quad (2)$$

Definition for each parameter is the same as definition of the parameters in formula (1). Correspondingly, linear convolution or circular convolution may be used in the filtering process. In a case that the circular convolution is used, the filtering process is described as follows: 1) calculating a filter based on the detection section for the angle of arrival direction (as shown in formula (2)); 2) zero-padding a received signal to make the received signal have a same length as the length N of the filter; 3) performing circular convolution on the received zero-padded signal and the filter; 4) intercepting the first M components of a signal after the circular convolution as a channel estimation result assuming that the number of antennas is M. In a case that the linear convolution is used, the filtering process is described as follows: 1) calculating a filter based on a detection section for the angle of arrival direction (as shown in formula (2)): 2) performing linear convolution on a received signal and the filter; 3) assuming that the number of the antennas is M, a signal after the convolution has N+M−1 components, superimposing the last (M−1) components on the first (M−1) components; 4) intercepting the first M components as a channel estimation result.

In another example, the evenly spaced two-dimensional antenna array is used for the access point (for example, as shown in FIG. 2), the discrete Fourier transform performed is a two-dimensional transform. A location of the rectangular window is determined based on the detection section, for example, a minimum index and a maximum index of the rectangular window in the horizontal direction are determined as follows.

$$\begin{cases} k_{min}^h = \left[ N_h - N_h\frac{D_1}{\lambda}\cos(\beta_{min})\cos(\theta_{min}) \right] \\ k_{max}^h = \left[ N_h - N_h\frac{D_1}{\lambda}\cos(\beta_{max})\cos(\theta_{max}) \right] \end{cases} \quad (3)$$

A minimum index and a maximum index of the rectangular window in the vertical direction are determined as follows.

$$\begin{cases} k_{min}^v = \left[ N_v - N_v\frac{D_2}{\lambda}\sin(\beta_{max}) \right] \\ k_{max}^v = \left[ N_v - N_v\frac{D_2}{\lambda}\sin(\beta_{min}) \right] \end{cases} \quad (4)$$

where $[\theta_{min}, \theta_{max}]$ a detection range of the angle of arrival in the horizontal direction, $[\beta_{min}, \beta_{max}]$ a detection range of the angle of arrival in the vertical direction, $D_1$ is an antenna space in the horizontal direction, and $D_2$ is an antenna space in the vertical direction, X is a wavelength of a received signal, $N_h$ is the number of points involved in the discrete Fourier transform in the horizontal direction, and $N_v$ is the number of points involved in the discrete Fourier transform in the vertical direction. Similarly, a filtering way based on convolution can be used rather than the discrete Fourier transform, which is not described repeatedly here any more.

The estimation for channel coefficients in the horizontal direction and the vertical direction obtained after the inverse discrete Fourier transform are $h_h$ and $h_v$, respectively. A whole channel estimation can be acquired by combining the acquired channel estimation in various directions via $h_h \otimes h_v$, for example, where $\otimes$ represents the kronecker product. In addition, although only an antenna array having a single polarization direction is described above, the channel estimation method above can also be applied to a case of cross polarization. For example, the transform and the filtering processing described above are performed in each polarization direction, estimation for channel coefficients in a first polarization direction is $h'_h$ and $h'_v$, estimation for channel coefficients in a second polarization direction is $h''_h$ and $h''_v$, and the whole estimation for the channel coefficients may be represented by $[h'_h \otimes h'_v, h''_h \otimes h''_v]$. It can be understood that, in a case that the antenna array has more polarization directions, the estimation for channel coefficients in all polarization directions can be combined in a similar way, so as to acquire the whole estimation for the channel coefficients.

In addition, it should be understood that although the rectangular window is used in the example described above, other window functions such as the hamming window or the Blackman window can be used besides the rectangular window. Correspondingly, in the convolution based filtering, a spatial-domain filter acquired by performing the inverse discrete Fourier transform on the window function described above can be used.

The apparatus 300 performs channel estimation based on the geographical location of the communication device, thereby improving accuracy of the channel estimation, reducing the pilot pollution and improving the performance of the system. In addition, in a case that the communication device transmits data to the apparatus 300, the apparatus 300 may further include a demodulation module (not shown in the Figure). The demodulation module can demodulate a data signal by using the channel estimation result obtained in the channel estimation way described above, in a case that the communication device transmits the pilot sequence (for example SRS) within a data transmission bandwidth, so as to obtain demodulated data with higher accuracy.

In an optional example of the present disclosure, the apparatus 300 includes a synchronization module (not shown in the Figure). The synchronization module 300 performs a correlation operation on the first uplink pilot sequence and the signal carrying the first uplink pilot sequence received by the apparatus 300, to determine an offset of the first uplink pilot sequence, and therefore determine information on timing advance of the communication device which transmits the first uplink pilot sequence and provide it to the communication device, thereby synchronizing the communication device with the apparatus 300. In the optional example, at least since the pilot sequence is allocated based on the interferences among cell partitions previously, timing advance determined by the synchronization module for a communication device corresponding to a specific uplink pilot would be more accurate.

In addition, the cell described here may include a macro cell and a small cell. That is, the embodiment of the present disclosure can be applied to a scenario of heterogeneous network. In a case that the small cell is included, the number of cell partitions within the small cell can be less than the number of cell partitions within the macro cell. Alternatively, the small cell is not divided, and is served as a cell partition as a whole.

Figure 7:
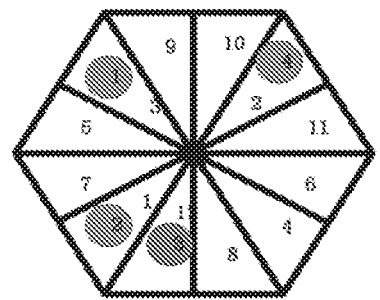
FIG. 7 shows a possible pilot pattern in a single-cell heterogeneous network.

FIG. 7 shows a possible pilot pattern in a single-cell heterogeneous network, in which, a whole hexagon represents a macro cell, and a gray dot represents a small cell. Assuming that the number of uplink pilot sequences orthogonal to each other is 12, the macro cell is uniformly divided into 12 cell partitions based on an angle of arrival in the horizontal direction to the access point, also 4 small cells are located within the macro cell, and each small cell supports 2 users at most.

In a case that a traditional method is used, since it is necessary to ensure that uplink pilot sequences used by users within the small cell and users within the macro cell are orthogonal to each other, the macro cell can support only four users when all of the small cells are in a service state. However with the channel estimation method including the filtering according to the embodiment, as long as an angle of arrival of a small cell can be distinguished from an angle of arrival of a cell partition which uses a same uplink pilot sequence as the small cell, it will do.

In FIG. 7, a number of a macro cell partition represents a number of an uplink pilot sequence used by the cell partition which is determined by the pilot determining unit 102. For example, an uplink pilot sequence 1 is used by a cell partition numbered 1. Uplink pilot sequences 1 and 2 are used by a small cell numbered 1, uplink pilot sequences 3 and 4 are used by a small cell numbered 2, uplink pilot sequences 5 and 6 are used by a small cell numbered 3, and uplink pilot sequences 7 and 8 are used by a small cell numbered 4. A pilot pattern illustrated here is only exemplary, and is not limited thereto, as long as the pilot pattern meets the following condition: a cell partition and a small cell which use the same uplink pilot sequence can be distinguished by the angle of arrival, thereby reducing interferences between the user of the small cell and the user of the macro cell by the operation of the channel estimation unit 301.

In the example, since a part of uplink pilot sequences are multiplexed between the small cell and the cell partition of the macro cell, the number of users capable of being served by the macro cell simultaneously is raised from 4 to 12, thereby significantly improving the overall performance of the system.

In addition, although only a pilot allocation way in a single-cell heterogeneous network is given in the embodiment, the conclusion is also applicable to a multi-cell heterogeneous network.

Fourth Embodiment

In the process of describing the apparatus for wireless network in the embodiments described above, it is obvious that some processing and methods are also disclosed. Hereinafter, an overview of the methods is given without repeating some details disclosed above. However, it should be noted that, although the methods are disclosed in a process of describing the apparatus for wireless communication, the methods do not certainly employ or are not certainly executed by the aforementioned components. For example, the embodiments of the apparatus for wireless communication may be partially or completely implemented with hardware and/or firmware, and the method for wireless communication described below may be executed by a computer-executable program completely, although the hardware and/or firmware of the apparatus for wireless communication can also be used by the methods.

Figure 8:
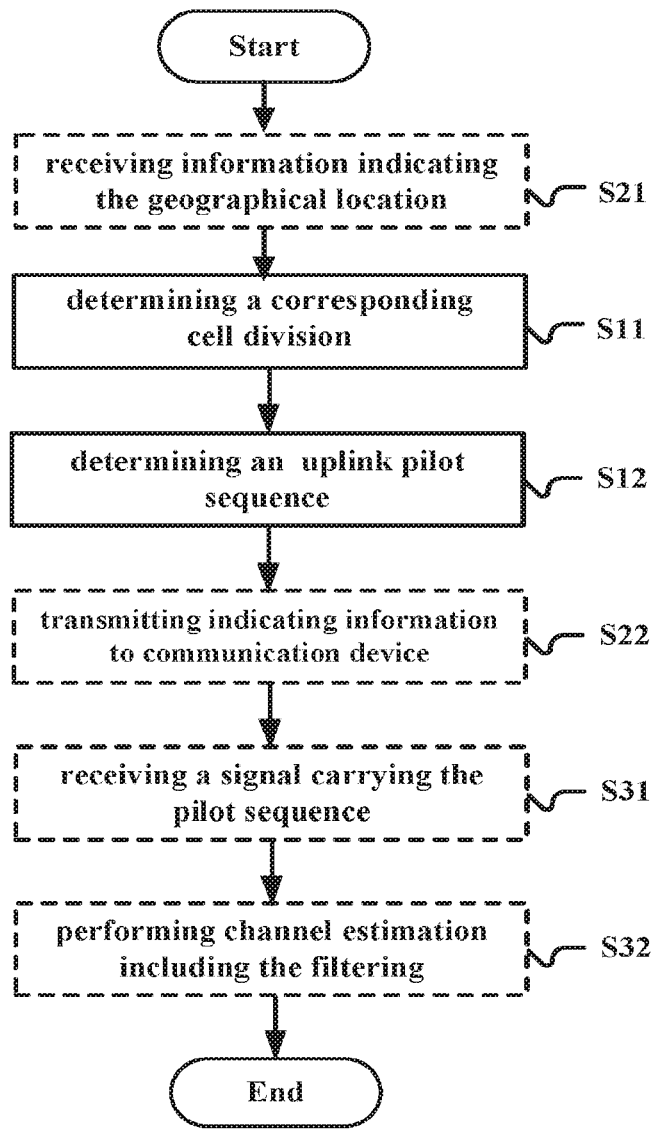
FIG. 8 is a flowchart showing a method for wireless communication according to an embodiment of the present disclosure.

FIG. 8 is a flowchart showing a method for wireless communication according to an embodiment of the present disclosure, the method includes: determining a cell partition corresponding to a geographical location of a communication device, each cell including multiple cell partitions (S11); and determining an uplink pilot sequence corresponding to the cell partition as an uplink pilot sequence of the communication device (S12).

Specifically, the geographical location of the communication device may be characterized by at least one of: an angle of arrival direction; an angle of arrival direction and a distance from the communication device to a base station: geographical coordinates; and an ID of a smell cell where the communication device is located.

In an example, in a case that it is determined in step S11 that the geographical location of the communication device changes into another small cell, an uplink pilot sequence of the small cell into which the communication device changes is determined as an uplink pilot sequence of the user equipment in step S12.

As shown in a dashed-line block in FIG. 8, before step S11, the method may further includes receiving information indicating the geographical location transmitted by the communication device (S21). Also, after step S12, the method may further include transmitting indicating information of the uplink pilot sequence to the communication device via a dedicated control signaling to allocate the uplink pilot sequence to the communication device (522).

In an example, the method described above further includes: receiving pilot pattern information including a correspondence between each cell partition and an uplink pilot sequence of the cell partition from a central node (not shown in FIG. 8), and determining, based on the pilot pattern information, the uplink pilot sequence of the user equipment in step S12.

In another example, the method described above may further include receiving uplink pilot sequence information of a cell partition within another cell adjacent to the cell partition where the communication device is located (not shown in FIG. 8); and determining, based on the uplink pilot sequence information of the cell partition within another cell, an uplink pilot sequence corresponding to the cell partition where the communication device is located in step S12.

Returning back to FIG. 8, in order to enable adjacent cell partitions correspond to different uplink pilot sequences, the method described above may further include: receiving a signal carrying a first uplink pilot sequence (531); and performing, based on the signal carrying the first uplink pilot sequence, channel estimation on the communication device to which the first uplink pilot sequence is allocated (S32), where filtering is performed during the channel estimation based on the geographical location of the communication device to which the first uplink pilot sequence is allocated, to obtain a channel estimation result matching the communication device.

Figure 9:
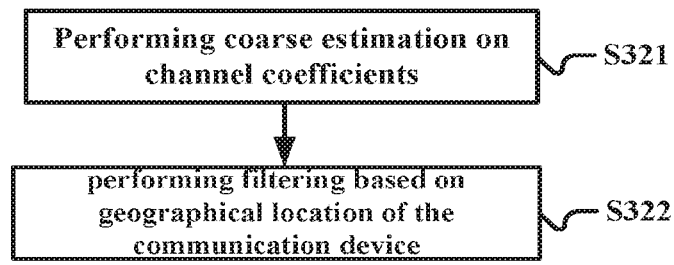
FIG. 9 is a flowchart showing sub steps of a step of channel estimation in the method in FIG. 8.

In an example, step S32 includes sub steps as shown in FIG. 9: performing, based on the signal carrying the first uplink pilot sequence and the first uplink pilot sequence, coarse estimation on channel coefficients (S321); and performing, based on the geographical location of the communication device to which the first uplink pilot sequence is allocated, filtering on the coarse estimation for the channel coefficients (S322).

Specifically, in step S322, the filtering can be performed by performing discrete Fourier transform on the coarse estimation for the channel coefficients and windowing a result of the transform. A specific way of the filtering has been described in detail in the third embodiment, which is not repeated here any more.

Fifth Embodiment

Figure 10:
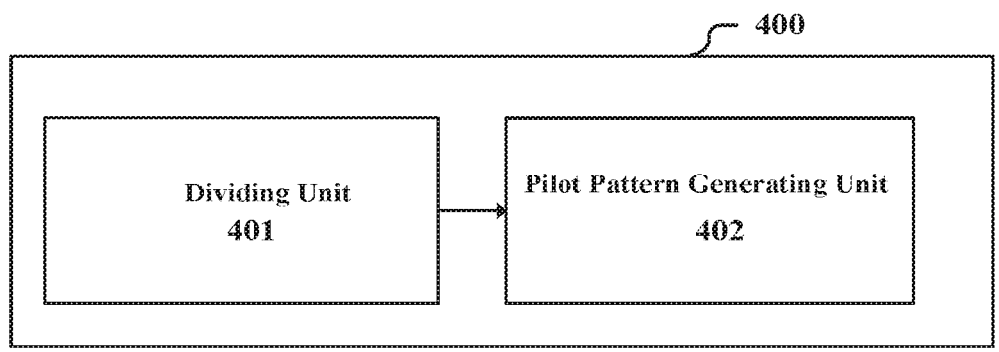
FIG. 10 is a structural block diagram showing an apparatus for wireless communication according to another embodiment of the present disclosure.

FIG. 10 is a structural block diagram showing an apparatus 400 for wireless communication according to an embodiment of the present disclosure. The apparatus 400 includes: a dividing unit 401, configured to divide each of multiple cells into multiple cell partitions; and a pilot pattern generating unit 402, configured to correspond multiple uplink pilot sequences with the cell partitions to generate a pilot pattern, where the pilot pattern is generated based on pilot interferences between different cell partitions which are corresponding to a same uplink pilot sequence.

It can be seen that the apparatus 400 plays the role of a central control node, and allocates the uplink pilot sequences by generally taking the pilot interferences between all cell partitions within a control range thereof into consideration.

Specifically, the dividing unit 401 can divide each of the cells into cell partitions having different shapes and sizes. For example, in a case that a one-dimensional evenly spaced linear antenna array is used for an access point, a dividing method shown in FIG. 11 can be used, that is, the cell is divided into different cell partitions only based on an angle of arrival in the horizontal direction to the access point. The dividing method is simple and easy to implement, in which, only interferences in the horizontal direction is mainly considered. In a case that a two-dimensional antenna array such as an evenly spaced planar array (shown in FIG. 2) is used for the access point, the access point not only has a resolution in the horizontal direction, but also has a resolution in the vertical direction. In this case, both the angle (the angle of arrival in the horizontal direction) and a distance/an angle of arrival in the vertical direction may be considered in the dividing, thereby improving the accuracy of the system. A possible dividing method is shown in FIG. 12.

Figure 11:
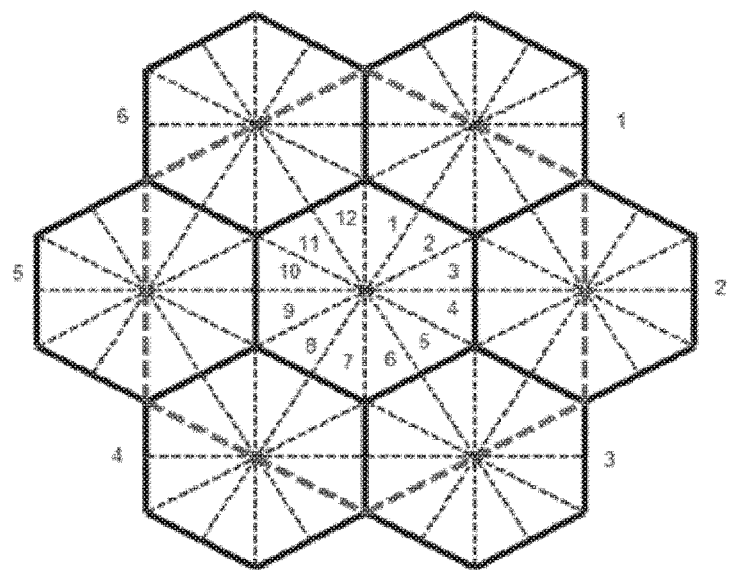
FIG. 11 shows an example of cell partition for a cell, an access point of which adopts a one-dimensional evenly spaced linear antenna array.
Figure 12:
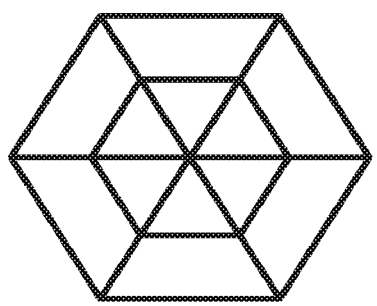
FIG. 12 shows an example of cell partition for a cell, an access point of which adopts a two-dimensional antenna array.

It should be noted that, FIG. 11 and FIG. 12 only show two special cases in dividing. Actual dividing can be determined based on cell deployment, and the cell partition can be designed to have an irregular shape based on for example detection accuracy for the geographical location of the user equipment.

In an example, the dividing unit 401 is configured to divide the cell into the cell partitions based on a distribution status of the communication devices within the cell. For example, in a case that a small cell is in a sleeping state since there is no user equipment to be served by the small cell within a preset time period, the dividing unit 401 can re-divide the cell into cell partitions without taking the small cell as a cell partition. The pilot pattern generating unit 402 regenerates a pilot pattern in a case that the dividing for the cell changes. The changing here may mean that the change in the dividing for the cell exceeds a certain extent, which can be measured according to various standards. It can be seen that, in this case, the pilot pattern is updated dynamically, and an update frequency can be controlled.

Preferably, after the cell is divided into cell partitions, the pilot pattern generating unit 402 is configured to generate a pilot pattern based on pilot interferences between different cell partitions which are corresponding to a same uplink pilot sequence.

For example, the pilot pattern generating unit 402 may generate the pilot pattern by minimizing a cost function as follows.

$$R_1 = f_1(p) \quad (5)$$

where p represents a pilot pattern, the cost function $f_1$ is a function in direct proportion to an average inter-cell interferences, and the cost function $f_1$ is used to measure the average inter-cell interferences born by the system in a case that pilot pattern p is used.

As an example, in a case that a one-dimensional evenly-spaced linear antenna array is used for the access point, in order to minimize the inter-cell interferences, the cost function $f_1$ may be selected as:

$$f_1 = \sum_m \sum_l \sum_s R_{msl} = \sum_m \sum_l \sum_s \frac{|t(\theta_{msm})^H t(\theta_{msl})|}{d_{msl}^\gamma} \quad (6)$$

where $R_{msl}$ is a metric for measuring an interference of a virtual user located in the center of an s-th cell partition within an l-th cell on an s-th cell partition in an m-th cell, $\theta_{msn}$ is an angle of arrival of a virtual user located in the center of the s-th cell partition within the m-th cell with respect to an access point in the m-th cell, $\theta_{msl}$ is an angle of arrival of a virtual user located in the center of the s-th cell partition within the l-th cell with respect to the access point in the m-th cell, $d_{msm}$ is a distance from a virtual user located in the center of the s-th cell partition within the m-th cell to the access point in the m-th cell, $\gamma$ is a path loss index defined in advance, and a vector $t(\theta)=[\cos(\theta), \sin(\theta)]^T$ is a direction vector in a unit length. The center of the cell partition herein for example refers to a geometric gravity center of the cell partition.

In formula (6), the numerator is to measure a correlation degree between angles of arrival direction of different users with respect to a certain access point, and the denominator is to measure a distance from an interfering cell partition to an access point within the interfered cell. Since the inter-cell interferences are related to both the angle of arrival direction and the distance of the interfering user, the inter-cell interferences born by all users within the whole system are measured accurately by formula (6) above.

In another aspect, in a case that two-dimensional antenna array (as shown in FIG. 2) is used for the access point, in order to minimize the inter-cell interferences, the cost function $f_1$ is represented as:

$$f_1 = \sum_m \sum_l \sum_s R_{msl} = \sum_m \sum_l \sum_s \frac{|t(\theta_{msm}, \beta_{msm})^H t(\theta_{msl}, \beta_{msl})|}{d_{msl}^{\gamma}} \quad (7)$$

where $\theta_{msm}$ is a sight-distance angle of arrival in the horizontal direction of a virtual user located in the center of an s-th cell partition within an m-th cell with respect to an access point in the m-th cell, $\theta_{msl}$ is a sight-distance angle of arrival in the horizontal direction of a virtual user located in the center of an s-th cell partition within the l-th cell with respect to an access point in the m-th cell, $\beta_{msm}$ is a sight-distance angle of arrival in the vertical direction of a virtual user located in the center of the s-th cell partition within the m-th cell with respect to the access point in the m-th cell, $\beta_{msl}$ is a sight-distance angle of arrival in the vertical direction of a virtual user located in the center of the s-th cell partition within the l-th cell with respect to the access point in the m-th cell. A direction vector in a unit length is represented as formula (8).

$$t(\theta,\beta)[\cos(\theta)\cos(\beta)\sin(\theta)\cos(\beta)\sin(\beta)]^T \quad (8)$$

A specific form of the cost function is given above, however, the cost function is not limited thereto, and any cost function which can reflect the average inter-cell interferences born by the system can be used. In addition, the pilot pattern can be generated by maximizing a utility function as follows.

$$R_2 = f_2(p) \quad (9)$$

where the function $f_2$ is a function in direct proportion to a sum rate of the cell, and is used to measure the performance of the system when the pilot pattern p is used.

How the pilot pattern generating unit 402 generates the pilot pattern by using the cost function $f_1$ is described below. It can be understood that, without considering the complexity, the cost function $f_1$ can be minimized by performing traversal search on all cell partitions, to generate the pilot pattern. However, the computing complexity in this case is very high.

As an example, the pilot pattern generating unit 402 may be configured to, with respect to a cell partition to which an uplink pilot sequence has been allocated, calculate interferences of the cell partition on all cell partitions adjacent to the cell partition, and allocate the same uplink pilot sequence to an adjacent cell partition on which the interference is minimum.

Returning back to FIG. 11, for example, uplink pilot sequences have been allocated for the 12 cell partitions of the cell (cell 0) in the center. Numbers 1 to 12 are used to represent the cell partitions and the allocated uplink pilot sequences orthogonal to each other (or groups of the uplink pilot sequences). The adjacent cell partitions of these cell partitions are defined as all other cell partitions within a thick dashed line in an example. For a cell partition for example cell partition 1 to which the uplink pilot sequence has been allocated, a cell partition in the adjacent cell partitions on which the interference is minimum is selected and allocated the same uplink pilot sequence. The interference for example can be measured by $R_{msl}$ in formula (6) described above. The operation described above is repeated, until no adjacent cell partition can be searched for the cell partitions (that is, cell partitions 1 to 12) to which the uplink pilot sequences have been allocated. For the remaining cell partitions, a pilot allocation way based on a traversal search can be used. Returning back to FIG. 6, it shows an example of a pilot pattern acquired by the pilot allocation process described above.

In addition, for a remaining cell partition, a pilot allocation way in which an uplink pilot sequence different from the uplink pilot sequence of each of the cell partitions directly adjacent to the remaining cell partition is allocated can also be used, to further reduce the computing complexity. It should be understood that FIG. 11 and FIG. 6 only show examples of the cell dividing and the pilot pattern generation, an application scope of the present disclosure is not limited thereto.

It should be noted that although one uplink pilot sequence is allocated to each cell partition in the above example, a group of uplink pilot sequences may also be allocated to each cell partition. The uplink pilot sequences in each group of the uplink pilot sequences are orthogonal to each other. Also, different groups of uplink pilot sequences can be allocated to adjacent cell partitions, to reduce interferences between users.

As described above, the multiple cells described above may include a macro cell and a small cell, and the number of cell partitions within the small cell is less than the number of cell partitions within the macro cell.

In addition, as an example, in a case that a coverage range of the small cell is small, the small cell can be not divided, and the small cell is taken as a cell partition as a whole. In this case, the dividing unit 401 divides only the macro cell.

In a traditional method, in order to ensure that there are no mutual interferences between a user of the small cell and a user of the macro cell, both the user of the macro cell and the user of the small cell use pilots orthogonal to each other. In this case, in order to ensure orthogonality of the pilots, the number of users supported by the macro cell is decreased. With the technology according to the embodiment, the small cell is also taken as an interference source, and the number of users served by the macro cell can be increased with the resulting pilot pattern, thereby significantly improving the whole performance of the system.

For ease of understanding the improvement for the performance of the system according to the embodiment, a specific simulation example is given below. In the example, cell construction and a cell dividing mode shown in FIG. 11 are adopted. That is, assuming that there are seven homogeneous cells and the one-dimensional evenly spaced linear antenna array is used for the access point, the number of users in each cell is 12 and each cell is divided into twelve cell partitions based on a range of an angle of arrival in the horizontal direction to the access point, and assuming that the ranges of the angles of arrival of cell partitions to the access point thereof are the same. The cell in the center is a target cell, and an object of the simulation research is the inter-cell interferences subjected by a user in the target cell and an achievable highest uplink data rate and an achievable highest downlink data rate. The traditional method is compared with the case of using the apparatus 300 according to the third embodiment.

Figure 6:
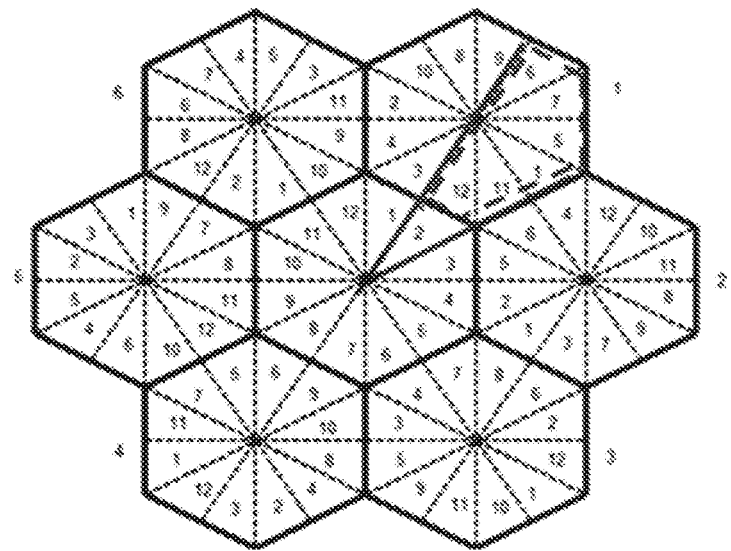
FIG. 6 shows an example of a pilot pattern according to an embodiment of the present disclosure.

As described above, a pilot pattern shown in FIG. 6 is generated in the way according to the embodiment. In FIG. 6, a number of each cell partition represents a sequence number of a group of uplink pilot sequences used by the cell partition, that is, a group 1 of uplink pilot sequences is used by users within the cell partition numbered 1.

A multipath channel model as follows is used in simulation.

$$h_{ml} = \frac{1}{\sqrt{P}} \sum_{p=1}^{P} a(\theta_p)\gamma_p \quad (10)$$

where $h_{ml}$ is a channel vector from a user within a l-th cell to an access point of an m-th cell, p is the number of multiple paths, $\theta_p$ is an angle of arrival from a p-th multipath to the access point of the m-th cell; $\gamma_p$ is a large-scale fading coefficient of a p-th path, a vector $a(\theta)$ is a gradient vector of the angle $\theta$ of arrival, which is represented as:

$$a(\theta) = \left[1, \exp\left\{-j2\pi\frac{D}{\lambda}\cos(\theta)\right\}, L, \exp\left\{-j2\pi\frac{(M-1)D}{\lambda}\cos(\theta)\right\}\right]^T \quad (11)$$

where D is a space between antennas of the access point, $\lambda$ is a wavelength of the received signal, L is a number of a cell (from 0 to 6 in the example). Other parameters used in the simulation is specifically described as follows: a radius of the cell is equal to 500 meters, a path loss coefficient is equal to 3.5, shadow fading variance is equal to 8 dB, a carrier frequency is equal to 2 GHz, a space between antennas is half of the signal wavelength, the number of multiple paths is equal to 50, and angular spread is equal to 10 degrees. Specifically, an angular spread distribution has two distribution models, one of the distribution models is a uniform distribution, which can ensure that angles of arrival of users within different cell partitions do not overlay with each other, and the other of the distribution models is a Gaussian distribution having a standard deviation of 10 degrees. Also, in order to ensure that users in a same cell can be distinguished by pilot-assisted means, a zero-forcing pre-coding algorithm is adopted to pre-code downlink data, and a zero-forcing detecting algorithm is adopted to detect uplink data. For simplifying analysis, only an analysis result for a user in the cell partition 1 is listed here.

A mean-square error of channel estimation for the access point is analyzed first, and the mean-square error in simulation is calculated as follows.

$$MSE(\text{dB}) = 10\log_{10}\left(\frac{E\{\|\hat{h} - h\|^2\}}{E\{\|h\|^2\}}\right) \quad (12)$$

where the vector h is a vector of an actual channel coefficient, and $\hat{h}$ is a vector of an estimated channel coefficient.

Figure 13:
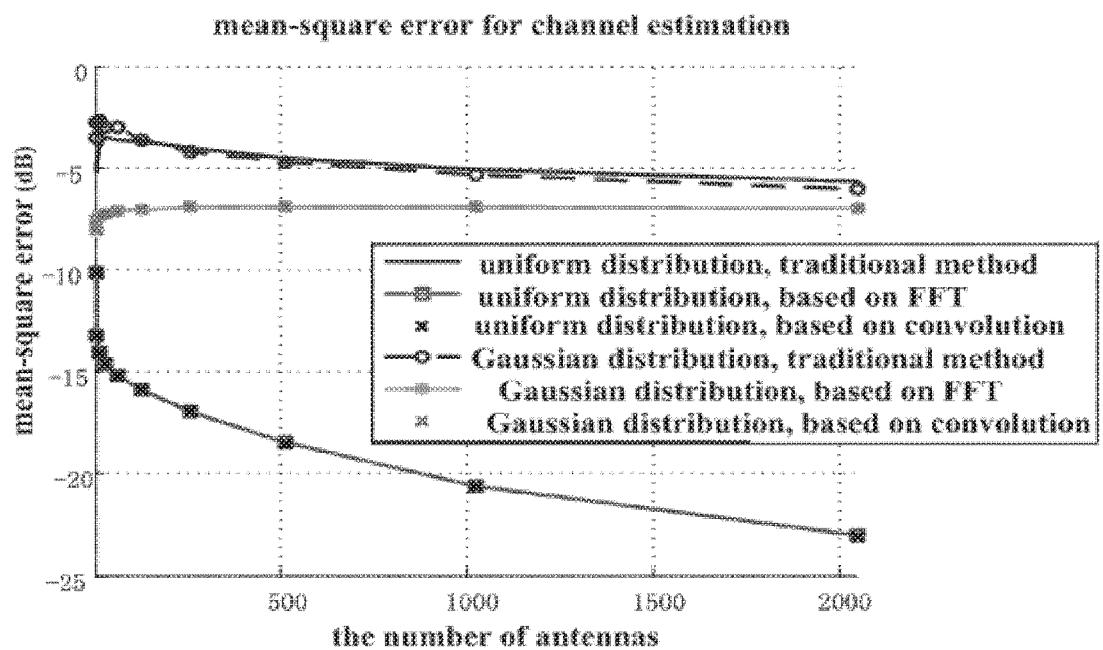
FIG. 13 is a graph showing a mean-square error of channel estimation according to a simulation example.

FIG. 13 is a simulation result of the mean-square error of the channel estimation, with respect to the two angular spread distribution models, i.e. the uniform distribution and Gaussian distribution, respectively. Specifically, in the traditional method, only coarse channel estimation is performed with the pilot assistance, and the subsequent filtering processing based on the geographical location of the communication device is not performed. In addition, a filtering method according to the embodiment is further shown, and the filtering method includes a filtering method based on the discrete Fourier transform and a filtering method using linear convolution.

As shown in FIG. 13, in a case that angles of arrival of users which use a same group of uplink pilot sequences do not overlap with each other, the mean-square error of the channel estimation can be decreased significantly with the method according to the present disclosure, and the mean-square error is decreased with the increase of the number of antennas of the access point. However, in a case that angles of arrival of users which use a same group of uplink pilot sequences overlap with each other, the mean-square error of the channel estimation can not be decreased significantly with the method according to the present disclosure, and the mean-square error of the channel estimation is not decreased correspondingly with the increase of the number of antennas of the access point. Since with respect to the angular spread for the Gaussian distribution, the angle of arrival is not completely limited to a certain range, and a part of multiple paths are filtered out by the rectangular window in the filtering. In this case, the mean-square error of the channel estimation can not be reduced even in a case that the number of antennas of the access point is increased.

Although the result in FIG. 13 indicates that in a case that angles of arrival of users which use a same uplink pilot sequence overlap with each other, the mean-square error of the channel estimation for the access point can not be decreased significantly, a subsequent simulation indicates that the method according to the present disclosure can improve capacity of the system effectively. Accordingly, an uplink signal to interference ratio (SIR) and a downlink signal to interference ratio (SIR) are defined first. For example, an uplink signal to interference ratio of a cell partition 1 of the center cell (defined as cell 0) is calculated as follows.

$$SIR_1^{uplink} = \frac{E\{\|A_{10}h_{010}\|^2\}}{E\left\{\left\|A_{10}\sum_{i\neq 0} h_{01i}\right\|^2\right\}} \quad (13)$$

where $h_{lsm}$ is a channel coefficient vector from an s-th cell partition in an m-th cell to an access point of an l-th cell, a matrix $A_{sm}$ is a detection matrix used by a user within the s-th cell partition in the m-th cell, and the zero-forcing detecting algorithm is used in simulation.

A downlink signal to interference ratio of the cell partition 1 of the center cell is calculated as follows.

$$SIR_1^{downlink} = \frac{E\{\|h_{010}^T W_{10}\|^2\}}{E\{\|\sum_{i \neq 0} h_{i10}^T W_{1i}\|^2\}} \quad (14)$$

where $W_{sm}$ is a pre-coding matrix used by a user in the s-th cell partition in the m-th cell, and the zero-forcing pre-coding algorithm is used in simulation.

The uplink channel capacity and downlink channel capacity each can be calculated based on the signal to interference ratio, and the calculating method is described as follows respectively.

$$C_1^{uplink} = \log_2(1 + SIR_1^{uplink}) \quad (15)$$

$$C_1^{downlink} = \log_2(1 + SIR_1^{downlink}) \quad (16)$$

Figure 14:
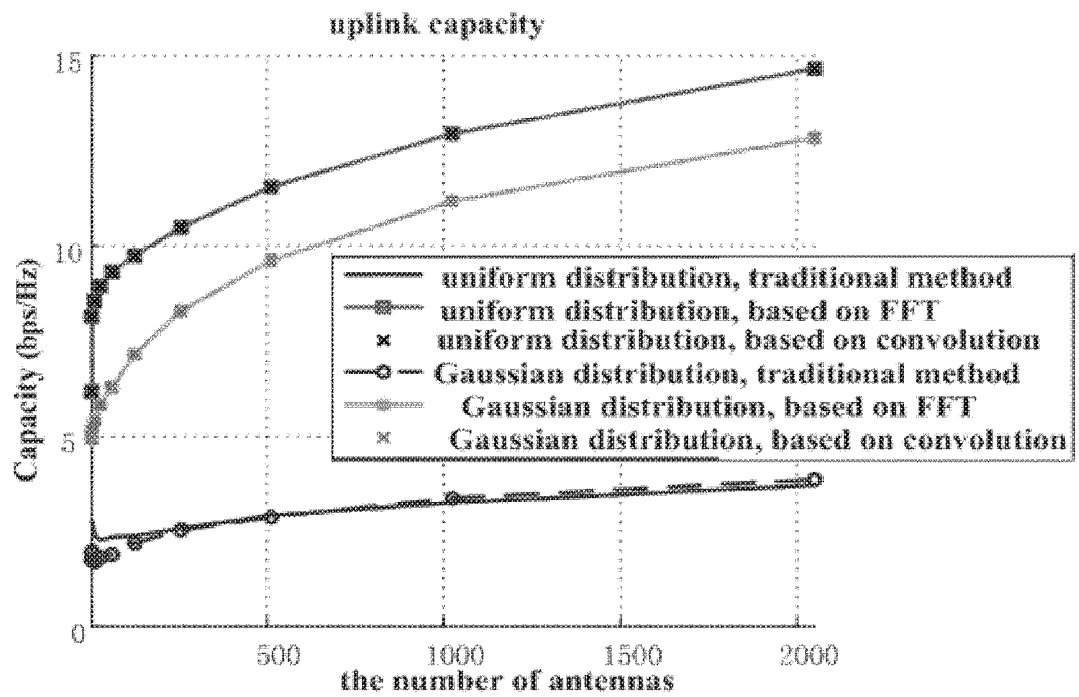
FIG. 14 is a graph showing an uplink capacity according to a simulation example.
Figure 15:
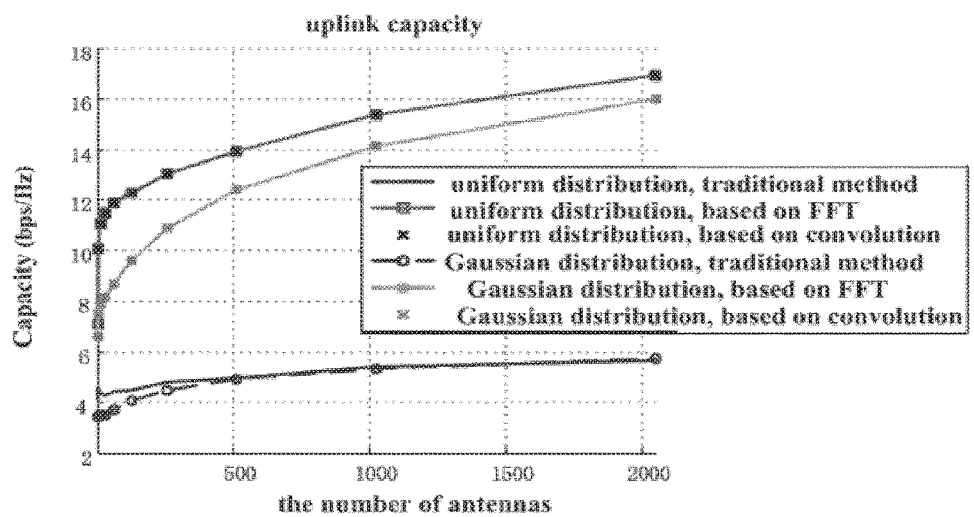
FIG. 15 is a graph showing a downlink capacity according to a simulation example.

FIG. 14 is an uplink channel capacity of the user in the cell partition 1. As shown in FIG. 14, although the mean-square error of the channel estimation can not be decreased in a case of angular spread of Gaussian distribution with the technology of the present disclosure described above, the uplink channel capacity can also be increased with the increase of the number of antennas of the access point. Compared with the angular spread of the uniform distribution, the uplink channel capacity in a case of the Gaussian distribution still has some loss. FIG. 15 is a downlink channel capacity of the user in the cell partition 1. Similar to FIG. 14, no matter whether the angular spread conforms to the uniform distribution or the Gaussian distribution, the downlink channel capacity can be raised with the increase of the number of antennas of the access point in the method according to the present disclosure. Compared with the traditional method, a significant gain is acquired in the method according to the embodiment of the present disclosure.

It should be understood that, the system example is only illustrative, and is not to be considered to limit the scope of the present disclosure.

Sixth Embodiment

Figure 16:
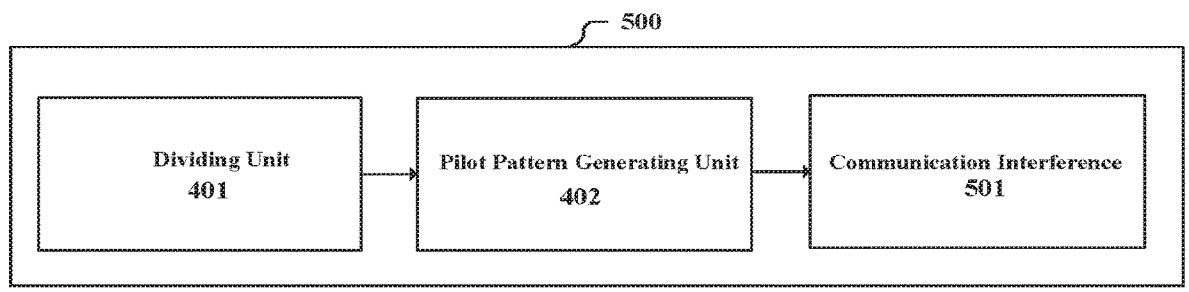
FIG. 16 is a structural block diagram showing an apparatus for wireless communication according to another embodiment of the present disclosure.

In the embodiment, the apparatus for wireless communication is a central node in communication with multiple cells. FIG. 16 is a structural block diagram showing an apparatus 500 for wireless communication according to the embodiment. Besides the units the same as those in FIG. 8, the apparatus 500 further includes a communication interface 501 configured to inform each cell of the pilot pattern corresponding to the cell.

The communication interface 501 may transmit the pilot pattern in response to a request of the cell, or transmit the pilot pattern periodically, or transmit a pilot patter in a case that the pilot pattern is generated renewedly.

In addition, in an example, each of the multiple cells may have different on-off states. The pilot pattern generating unit 402 is configured to, with respect to different combinations of the on-off states of the cell, generate the pilot pattern, and store as a mapping table.

Since a change in the on-off state of the cell affects inter-cell interference status, the pilot pattern is caused to be changed. In particular, in a case that a macro cell includes small cells, a change in the on-off state of a small cell occurs more frequently, and the pilot pattern generating unit 402 may generate a pilot pattern with respect to all combinations of the on-off states and store the pilot pattern.

Correspondingly, the communication interface 501 may be configured to renewedly inform, based on the mapping table, each cell of a corresponding pilot pattern in a current on-off state, in the case that the on-off states of the cells change. Specifically, information on the uplink pilot sequences which are allocated to each small cell is transmitted to a base station corresponding to the small cell. Alternatively, the communication interface 501 may perform the informing periodically.

Practically, the pilot pattern generating unit 402 may not store the pilot patterns with respect to all combinations of the on-off states in advance, and generate the pilot pattern temporarily as needed.

By generating the pilot pattern with respect to different combinations of the on-off states of the cell, the apparatus 500 may provide a pilot pattern suitable for a current environment to each cell, thereby improving the performance of the system.

The apparatus 400 and the apparatus 500 can be, as a component (for example a control chip), disposed in a management device such as a server for managing multiple cells, for example a server on a core network side, or a super controller (SRC)/Cloud BB (basic band) in an unbounded network solution (for example, C-RAN). In addition, the apparatus 400 and the apparatus 500 above may also be a management device itself such as a server for managing multiple cells. The regular components included in the apparatus 400 and the apparatus 500 are the same as those components in the conventional technology, which are not described repeatedly in the present disclosure any more.

Seventh Embodiment

In the process of describing the apparatus for wireless network in the embodiments described above, obviously, some processing and methods are also disclosed. Hereinafter, an overview of the methods is given without repeating some details disclosed above. However, it should be noted that, although the methods are disclosed in a process of describing the apparatus for wireless communication, the methods do not certainly employ or are not certainly executed by the aforementioned components. For example, the embodiments of the apparatus for wireless communication may be partially or completely implemented with hardware and/or firmware, the method for wireless communication described below may be executed by a computer-executable program completely, although the hardware and/or firmware of the apparatus for wireless communication can also be used by the methods.

Figure 17:
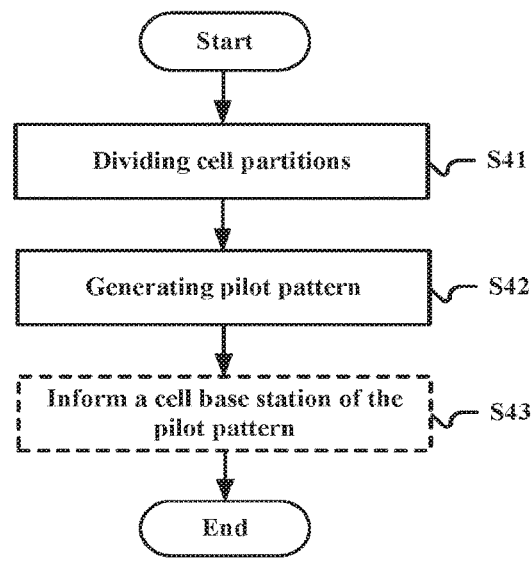
FIG. 17 is a flowchart showing a method for wireless communication according to another embodiment of the present disclosure.

FIG. 17 is a flowchart showing a method for wireless communication according to an embodiment of the present disclosure, and the method includes: dividing each of multiple cells into multiple cell partitions (S41): and corresponding multiple uplink pilot sequences with the cell partitions, to generate a pilot pattern (S42), where the pilot pattern is generated based on pilot interferences between different cell partitions which are corresponding to a same uplink pilot sequence.

In step S41, the cell may be divided into the cell partitions according to a distribution status of communication devices within the cell. In a case that the dividing for the cell changes, step S42 is executed again to regenerate a pilot pattern.

The multiple cells described above include a macro cell and a small cell, and the number of cell partitions within the small cell is less than the number of cell partitions within the macro cell. As an example, the small cell may not be divided, and the whole small cell is taken as a cell partition.

In an example, interferences of the cell partition to which the uplink pilot sequence is allocated on all cell partitions adjacent to the cell partition are calculated in step S42, and a same uplink pilot sequence is allocated to an adjacent cell partition on which the interference is minimum.

The method described above can be executed at a central node in communication with a base station corresponding to multiple cells. As shown in a dashed-line block in FIG. 17, the method may further include informing a base station of each of the cells of the corresponding pilot pattern (S43).

In addition, each of multiple cells may have different on-off states respectively. In step S42, a pilot pattern is generated with respect to different combinations of the on-off states of the cells, and stored as a mapping table. In this case, in a case that the on-off states of the cells change, step S43 is executed again to inform a base station of each of the cells of a corresponding pilot pattern in the current on-off state based on the mapping table.

The details of the method described above have been described in detail in the fifth embodiment and the sixth embodiment, which are not repeated here any more. In the method, the pilot pattern is generated by generally considering the interference between cells, thereby significantly reducing the pilot pollution and improving the performance of the system.

Eight Embodiment

Figure 18:
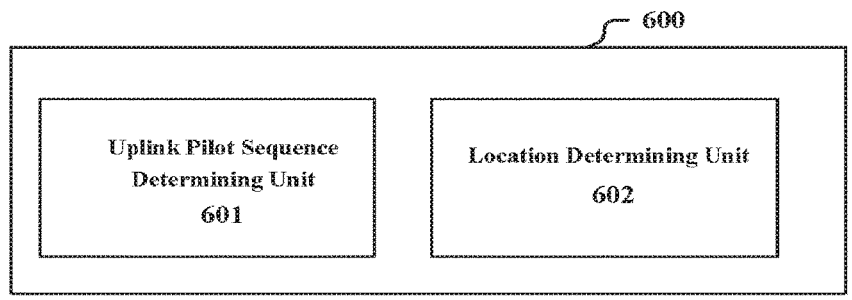
FIG. 18 is a structural block diagram showing an electronic device according to an embodiment of the present disclosure.

A structural block diagram of an electronic device 600 according to an embodiment of the present disclosure is described below with reference to FIG. 18. The electronic device 600 includes: an uplink pilot sequence determining unit 601, configured to determine, based on indicating information of the uplink pilot sequence allocated by a base station, an uplink pilot sequence of the electronic device 600: and a location determining unit 602, configured to determine a change in a geographical location of the electronic device 600. In a case that the geographical locations of the electronic device 600 before and after changing correspond to different cell partitions, the uplink pilot sequence determining unit 601 updates the uplink pilot sequence of the electronic device 600 based on the indicating information of the uplink pilot sequence allocated by the base station, and the updated uplink pilot sequence corresponds to a cell partition corresponding to the geographical location of the electronic device 600 after changing.

The indicating information of the uplink pilot sequence may be an index indicating the uplink pilot sequence (for example, SRS-ConfigIndex in the LTE standard), and may also be the uplink pilot sequence itself. For example, in the LTE standard, the indicating information may be included in a dedicated control signaling transmitted by the base station, for example a RRC signaling. In addition, the indicating information may further be included in a broadcasting signal including the pilot allocating information transmitted by the base station. The uplink pilot sequence determining unit 601 determines the uplink pilot sequence for the electronic device 600 by parsing the signaling described above.

In a case that the transmitted indicating information is the index, the electronic device 600 and the base station have for example appointed a correspondence between an index and an uplink pilot sequence in advance, and then the uplink pilot sequence determining unit 601 can determine an uplink pilot sequence to be used correctly.

The location determining unit 602 determines whether the location of the electronic device 600 changes, for example, whether the location of the electronic device 600 changes into a cell partition different from the current cell partition. In a case that it is determined that the location of the electronic device 600 changes, it means that the uplink pilot sequence used by the electronic device 600 may change. Therefore, the uplink pilot sequence determining unit 601 needs to update the uplink pilot sequence of the electronic device 600 to an uplink pilot sequence corresponding to the cell partition after the geographical location changing based on the indicating information of the uplink pilot sequence allocated by the base station. In an example of the present disclosure, the location determining unit 602 includes a GPS module to determine the change in the location. In another example, the location determining unit 602 receives an ID of the small cell broadcasted by a small cell base station to determine the change in the location of the electronic device 600. In addition, for example, in the LTE, the base station (eNodeB) can schedule each user equipment (UE) to transmit the SRS at one time or periodically. After the user equipment in which the electronic device 600 described above is disposed determines the uplink pilot sequence based on the indicating information of the uplink pilot sequence allocated by the base station, the user equipment may transmit the SRS signal corresponding to the cell partition where the UE is located to the base station at one time or periodically according to the scheduling of the base station.

The electronic device 600 described here may be a user equipment such as a mobile terminal, a vehicle, an intelligent wearable device or a component thereof, or may also be an infrastructure such as a small cell base station or a component of the small cell base station. In a case that the electronic device is the small cell base station, a macro base station corresponding to the small cell base station allocates indicating information of the pilot sequence to the small cell base station.

The electronic device 600 according to the present disclosure may update the uplink pilot sequence to be used automatically based on the change in the geographical location thereof, thereby improving the communication quality.

Ninth Embodiment

Figure 19:
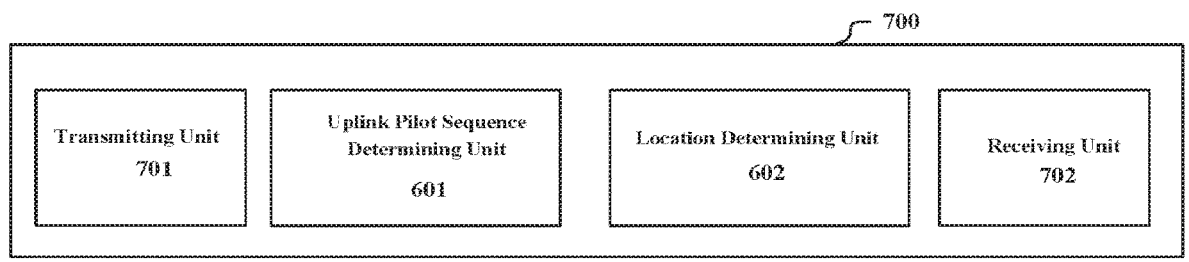
FIG. 19 is a structural block diagram showing an electronic device according to another embodiment of the present disclosure.

FIG. 19 is a structural block diagram showing an electronic device 700 according to another embodiment of the present disclosure. Besides the components the same as those in FIG. 18, the electronic device 700 further includes: a transmitting unit 701, configured to transmit information on the geographical location of the electronic device; and a receiving unit 702, configured to receive the indicating information of the uplink pilot sequence allocated by the base station.

Specifically, the transmitting unit 701 can transmit the information on the geographical location by at least one of: transmitting periodically; transmitting when the location determining unit 601 determines that the change in the location exceeds a predetermined range; and transmitting according to location updating request information of the base station. It can be understood that the transmitting unit 701 may transmit the information on the geographical location in any existing manner and signal format. Particularly, in a case that the electronic device 700 initially accesses in the network, the electronic device 700 can transmit a signal by using a predetermined uplink pilot sequence or in a robust modulation format to report the information on the geographical location thereof.

The receiving unit 702 receives a dedicated control signaling including the indicating information of the uplink pilot sequence, and the uplink pilot sequence determining unit 601 parses the dedicated control signaling to determine the uplink pilot sequence of the electronic device 700. The dedicated control signaling may be for example a RRC signaling in the LTE standard.

In addition, the receiving unit 702 may further receive a broadcasting signaling including the indicating information of the uplink pilot sequence, and the broadcasting signaling includes a correspondence between multiple cell partitions and multiple uplink pilot sequences. The uplink pilot sequence determining unit 601 parses the broadcasting signaling and determines, based on a cell partition corresponding to a current location of the electronic device, the uplink pilot sequence of the electronic device. In this case, the transmitting unit 701 may not transmit the information on the geographical location of the electronic device either.

The apparatus 700 transmits the information on the geographical location thereof and receives the indicating information of the uplink pilot sequence allocated by the base station in various ways, and thus the uplink pilot sequence to be used can be changed flexibly, thereby improving the performance of the communication system.

Tenth Embodiment

In the process of describing the electronic device in the embodiments described above, obviously, some processing and methods are also disclosed. Hereinafter, an overview of the methods is given without repeating some details disclosed above. However, it should be noted that, although the methods are disclosed in a process of describing the electronic device, the methods do not certainly employ or are not certainly executed by the aforementioned components. For example, the embodiments of the electronic device may be partially or completely implemented with hardware and/or firmware, the method for the electronic device described below may be executed by a computer-executable program completely, although the hardware and/or firmware of the electronic device can also be used in the methods.

Figure 20:
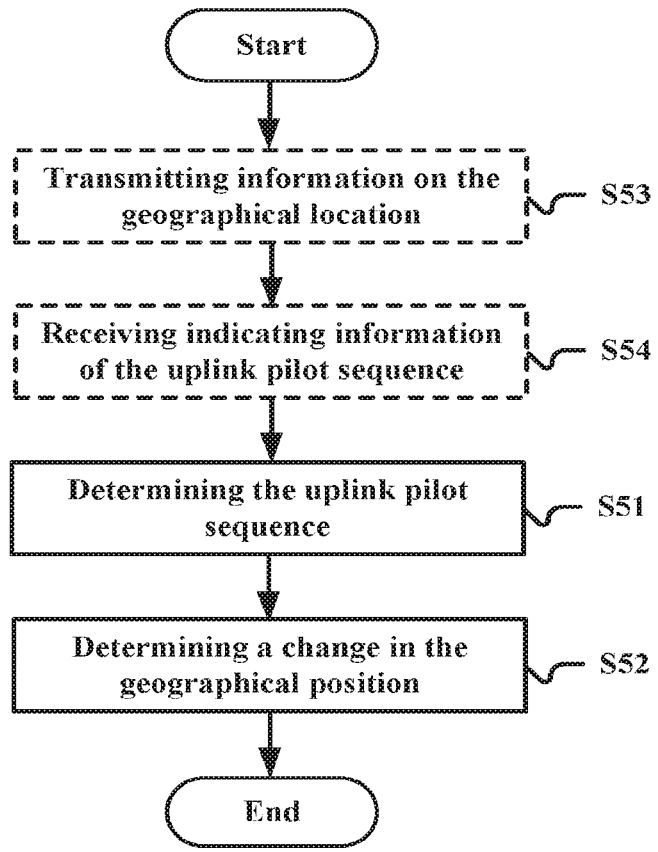
FIG. 20 is a structural block diagram showing a method for an electronic device according to an embodiment of the present disclosure.

As shown in FIG. 20, the method for the electronic device according to the embodiment of the present disclosure includes: determining, based on the indicating information of the uplink pilot sequence allocated by the base station, an uplink pilot sequence of the electronic device (S51): and determining a change in a geographical location of the electronic device (S52). In a case that the geographical locations of the electronic device before and after changing correspond to different cell partitions, step S51 is executed again, to update the uplink pilot sequence of the electronic device based on the indicating information of the uplink pilot sequence allocated by the base station, and the updated uplink pilot sequence corresponds to a cell partition corresponding to the geographical location of the electronic device after changing.

In addition, as shown in a dashed-line block in FIG. 20, the method may further include: transmitting information on the geographical location of the electronic device (S53); and receiving the indicating information of the uplink pilot sequence allocated by the base station (S54).

In step S53, the information on the geographical location can be transmitted by at least one of: transmitting periodically; transmitting when it is determined in step S52 that the change in the location exceeds a predetermined range; and transmitting according to location updating request information of the base station.

In an example, a dedicated control signaling including the indicating information of the uplink pilot sequence can be received in step S54, and the dedicated control signaling is parsed in step S52 to determine the uplink pilot sequence of the electronic device. The dedicated control signaling may be for example a RRC signaling in the LTE standard.

In addition, a broadcasting signaling including the indicating information of the uplink pilot sequence is received in step S54, and the broadcasting signaling includes a correspondence between multiple cell partitions and multiple uplink pilot sequences. The broadcasting signaling is parsed and the uplink pilot sequence of the electronic device is determined based on a cell partition corresponding to a current location of the electronic device in step S52. In this case, step S53 of transmitting the information on the geographical location of the electronic device may not be executed.

With the method described above, the used uplink pilot sequence can be changed flexibly based on the change in the geographical location of the electronic device, thereby improving communication quality. The details of the method have been described in detail in the eighth embodiment and the ninth embodiment, which are not repeated here any more.

Eleventh Embodiment

Figure 21:
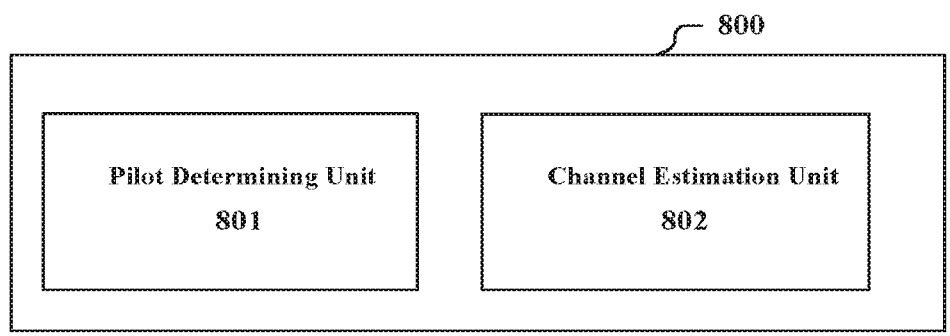
FIG. 21 is a structural block diagram showing an apparatus for wireless communication according to another embodiment of the present disclosure.

FIG. 21 is a structural block diagram showing an apparatus 800 for wireless communication according to another embodiment of the present disclosure. The apparatus 800 includes: a pilot determining unit 801, configured to determine a first uplink pilot sequence for a first communication device; and a channel estimation unit 802, configured to perform, based on a received signal carrying the first uplink pilot sequence, channel estimation on the first communication device, where the channel estimation unit 802 performs filtering during the channel estimation based on a geographical location of the first communication device, to obtain a channel estimation result matching the first communication device.

The pilot determining unit 801 may be the same as the pilot determining unit 102 described in the first embodiment to the third embodiment, or may use another way of determining the uplink pilot sequence, which is not limited to the technology according to the present disclosure.

The channel estimation unit 802 may have a same structure as the channel estimation unit 301 described in the third embodiment. In an example, the channel estimation unit 802 may include: a coarse channel estimation module 3001, configured to perform, based on the signal carrying the first uplink pilot sequence and the first uplink pilot sequence, coarse estimation on channel coefficients; and a spatial filtering module 3002, configured to filter, based on the geographical location of the first communication device, the coarse estimation for the channel coefficients. An example of the structure and function of the channel estimation unit 802 has been described in detail in the third embodiment, which is not repeated here.

In the embodiment, the spatial filtering module 3002 may estimate the graphical location of the first communication device based on the coarse estimation for the channel coefficients. For example, the geographical location of the first communication device may be characterized at least by a direction of the first communication device with respect to the apparatus 800, such as an angle of arrival direction of a signal. It can be understood that angles of arrival direction corresponding to communication devices in different geographical locations are different, and by filtering based on the angle of arrival direction, the spatial filtering module 3002 can filter out the interferences from another communication device, the location of which is greatly different from the location of the first communication device. Specifically, the another communication device described here may be located in a same cell as the first communication device, or may be located in a different cell from the first communication device. For example, in a case that a same or correlated uplink pilot sequence is used by adjacent cells, pilot pollution at an edge of the cells can be reduced in the present disclosure. For example, spatial multiplexing for the uplink pilot signal within a same cell is feasible with the spatial filtering solution according to the present disclosure, so that the same or the correlated uplink pilot sequence can be used by different communication devices within the same cell.

Figure 22:
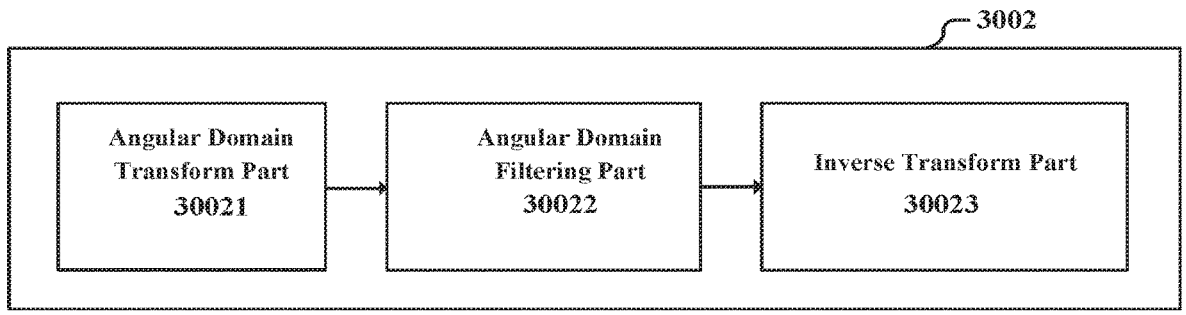
FIG. 22 is a structural block diagram showing an example of a spatial filtering module according to an embodiment of the present disclosure.

In an example, as shown in FIG. 22, the spatial filtering module 3002 may include: an angular domain transform part 30021, configured to perform angular domain transform on the coarse estimation for the channel coefficients; an angular domain filtering part 30022, configured to perform filtering on the angular domain transform based on the direction described above; and an inverse transform part 30033, configured to perform inverse Fourier transform on a result obtained after the filtering to obtain a channel estimation result.

Assuming that antenna array configuration of the base station is represented as (M, N, 2), that is, there are M×N antenna arrays with cross polarization. $\hat{\theta}'$ and $\hat{\phi}'$ are used to represent preliminary estimation for an angle of arrival in a vertical direction and an angle of arrival in a horizontal direction for a first polarization direction respectively, $\hat{\theta}''$ and $\hat{\phi}''$ are used to represent preliminary estimation for an angle of arrival in a vertical direction and an angle of arrival in a horizontal direction for a second polarization direction, and preset scattering angles are represented as $\sigma_\theta$ and $\sigma_\phi$. In addition, $\hat{h}'_e$ and $\hat{h}'_a$ represent coarse estimation for channel coefficients in the vertical direction and in the horizontal direction for the first polarization direction, respectively, and $\hat{h}''_e$ and $\hat{h}''_a$ represent coarse estimation for channel coefficients in the vertical direction and in the horizontal direction for the second polarization direction, respectively, $\hat{h}'_e$ and $\hat{h}'_a$ are vectors having a length of M, respectively, and $\hat{h}''_e$ and $\hat{h}''_a$ are vectors having a length of N.

The angular domain transform part 30021 transforms $\hat{h}'_e$, $\hat{h}'_a$, $\hat{h}''_e$ and $\hat{h}''_a$ into the angular domain by using for example the Fourier transform, respectively, as shown in formula (17):

$$G'_e(\omega) = \sum_{m=0}^{M-1} \hat{h}'_e(m) e^{-jm\omega}$$

$$G'_a(\omega) = \sum_{n=0}^{N-1} \hat{h}'_a(n) e^{-jn\omega}$$

$$G''_e(\omega) = \sum_{m=0}^{M-1} \hat{h}''_e(m) e^{-jm\omega}$$

$$G''_a(\omega) = \sum_{n=0}^{N-1} \hat{h}''_a(n) e^{-jn\omega}$$

(17)

The angular domain filtering part 30022 can acquire the preliminary estimation $\hat{\theta}'$ and $\hat{\phi}'$ for the angle of arrival in the vertical direction and the preliminary estimation $\hat{\theta}''$ and $\hat{\phi}''$ for the angle of arrival in the horizontal direction for the two polarization directions, and use a filter based on the preliminary estimation to perform filtering on the angular domain transform. For example, an angle corresponding to a maximum value in the angular domain transform is taken as the preliminary estimation for the angle of arrival, and a bandpass filter centered on the preliminary estimation is used to perform filtering. An example of the filter is described in formula (18), where the width of the pass band can be set based on the preset scattering angle.

$$\overline{G}(\omega) = \begin{cases} G(\omega), & \omega \in (\omega_0 - \sigma/2, \omega_0 + \sigma/2) \\ 0, & \text{others} \end{cases}$$

(18)

where $G(\omega)$ is one of the formulas (17), $\omega_0$ is estimation on an angle of arrival corresponding to the direction and polarization, and $\sigma$ is the scattering angle corresponding to the direction.

Then, the inverse transform part 30033 performs inverse Fourier transform on the result obtained after the filtering to obtain a channel estimation result. The channel estimation result can be represented in formula (19) below by combining the filtering and the inverse transform.

$$\overline{h}'_e(m) = \frac{1}{2\pi} \int_{\hat{\theta}' - \frac{\sigma_\theta}{2}}^{\hat{\theta}' + \frac{\sigma_\theta}{2}} G'_e(\omega) e^{jm\omega} d\omega$$

$$\overline{h}'_a(n) = \frac{1}{2\pi} \int_{\hat{\phi}' - \frac{\sigma_\theta}{2}}^{\hat{\phi}' + \frac{\sigma_\theta}{2}} G'_a(\omega) e^{jn\omega} d\omega$$

$$\overline{h}''_e(m) = \frac{1}{2\pi} \int_{\hat{\theta}'' - \frac{\sigma_\theta}{2}}^{\hat{\theta}'' + \frac{\sigma_\theta}{2}} G''_e(\omega) e^{jm\omega} d\omega$$

$$\overline{h}''_a(n) = \frac{1}{2\pi} \int_{\hat{\phi}'' - \frac{\sigma_\phi}{2}}^{\hat{\phi}'' + \frac{\sigma_\phi}{2}} G''_a(\omega) e^{jn\omega} d\omega$$

(19)

For example, the overall channel estimation can be acquired by combining the acquired channel estimation in each direction and each polarization via the following formula (20).

$$\overline{h} = [\overline{h}'_e \otimes \overline{h}'_a, \overline{h}''_e \otimes \overline{h}''_a]$$

(20)

where $\otimes$ represents the kronecker product. It should be noted that although specific formulas for angular domain transform and filtering are shown here, which are not limited thereto, and any way of transforming the coarse estimation for the channel coefficients into the angular domain can be used.

As another example, the angular domain filtering part 30022 may also design a filter based on the preliminary estimation using empirical values. For example, a bandwidth of the filter shown in formula (18) can be set according to empirical values such as an empirical angle spread, estimation deviation for the angle of arrival and the like.

It can be seen that the spatial filtering module 3002 may reduce interferences of a signal carrying the correlated uplink pilot sequence from a communication device in other directions.

Figure 23:
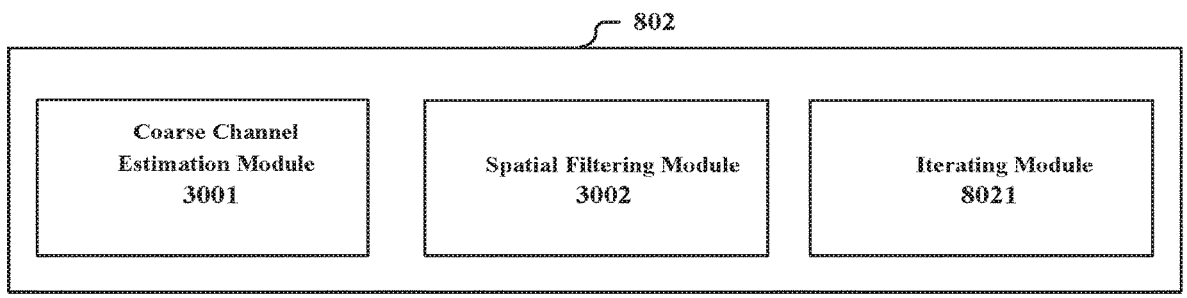
FIG. 23 is a structural block diagram showing an example of a channel estimation unit according to an embodiment of the present disclosure.

In addition, as shown in FIG. 23, the channel estimation unit 802 may further include: an iterating module 8021, configured to provide the channel estimation result acquired by the inverse transform part 30033 as the coarse estimation for the channel coefficients to the spatial filtering module 3002, to further perform filtering. Since the channel estimation result acquired by the inverse transform part 30033 has filtered out a part of interferences, the angular domain filtering part 30022 may acquire a more accurate estimation value for the angle of arrival based on the channel estimation result, thereby performing more accurate filtering, and further improving the channel estimation result.

The signal carrying the first uplink pilot signal described above may be for example a Sounding Reference Signal (SRS) or an uplink demodulation reference signal (DMRS). A downlink reference signal after beamforming may be for example at least one of a cell reference signal after the beamforming and a channel state information reference signal after the beamforming.

In addition, an example of estimating an approximate geographical location (for example direction) of the communication device by coarse estimation for the channel coefficients is described above, however, other ways can be used. For example, estimation is performed on for example the angle of arrival based on a measurement report of the communication device for the downlink reference signal after the beamforming, and then filtering is performed based on the estimation. Specifically, the apparatus 800 performs beamforming processing on the downlink reference signal, transmits a reference signal obtained after the beamforming processing to different directions for example in a time division manner, and receives a measurement report fed back from the communication device served by the apparatus 800. For example, a beam direction corresponding to a strongest measurement result is taken as an angle of arrival of the communication device. In addition, direction estimation may be performed for example by the cell partition where the communication device is located, for example, $\hat{\theta}'$ and $\hat{\phi}'$ as well as $\hat{\theta}''$ and $\hat{\phi}'$ described above can be determined based on the ID of the cell partition. It can be understood that estimation for the angle of arrival direction can be acquired according to the conventional technology such as feedback of a positioning reference signal and GPS positioning information, which is not enumerated here. The operation about the subsequent filtering and the inverse transform described above is also applicable in this case.

As described above, the channel estimation unit 802 performs filtering during the channel estimation based on the geographical location of the first communication device. The channel estimation unit 802, by making use of a distribution difference of channel coefficients caused by difference of geographical locations of the communication devices, filter out a channel response of the communication devices, except the target communication device, i.e. the first communication device, which use the same uplink pilot sequence. Therefore, at least one of the following can be realized: reducing uplink pilot sequence interferences between cells or within a cell, effectively reducing the mean-square error of the channel estimation, and improving the capacity of the communication system. In addition, a feasible way for spatial multiplexing of the uplink pilot sequence is provided. Especially in a case that the coherent bandwidth is small and the relative mobility is high, more communication devices can be supported.

In an example, the apparatus 800 may be operated as a base station, the first communication device is a user equipment, and the apparatus 800 may further include a transceiver unit configured to receive the signal described above.

Similarly, In the process of describing the apparatus for wireless network in the embodiments described above, obviously, some processing and methods are also disclosed. Hereinafter, an overview of the methods is given without repeating some details disclosed above. However, it should be noted that, although the methods are disclosed in a process of describing the apparatus for wireless communication, the methods do not certainly employ or are not certainly executed by the aforementioned components. For example, the embodiments of the apparatus for wireless communication may be partially or completely implemented with hardware and/or firmware, the method for wireless communication described below may be executed by a computer-executable program completely, although the hardware and/or firmware of the apparatus for wireless communication can also be used in the methods.

Figure 24:
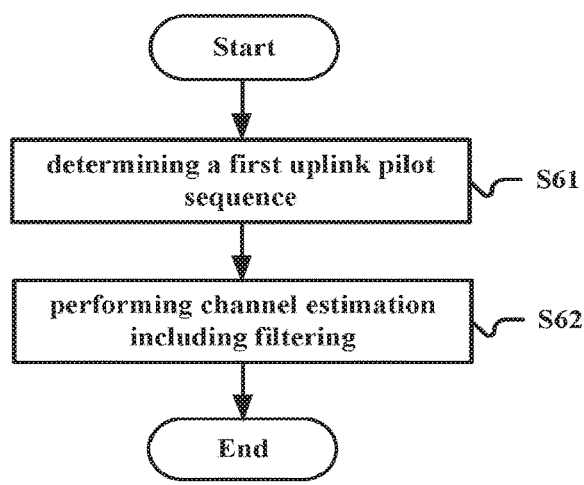
FIG. 24 is a flowchart showing a method for wireless communication according to another embodiment of the present disclosure.

As shown in FIG. 24, a method for wireless communication is provided, which includes: determining a first uplink pilot sequence of a first communication device (S61); and performing, based on a received signal carrying the first uplink pilot sequence, channel estimation on the first communication device (S62). Filtering is performed during the channel estimation based on the geographical location of the first communication device, to obtain a channel estimation result matching the first communication device.

In an example, step S62 may include the following sub-steps: a) performing, based on the signal carrying the first uplink pilot sequence and the first uplink pilot sequence, coarse estimation on channel coefficients; b) performing, based on the geographical location of the first communication device, filtering on the coarse estimation for the channel coefficients.

As an example, the geographical location of the first communication device can be estimated according to the coarse estimation for the channel coefficient. Specifically, the geographical location of the first communication device can be characterized at least by a direction of the first communication device with respect to the base station, for example, an angle of arrival direction of the signal.

In another example, the geographical location of the first communication device can also be estimated based on the measurement result for the reference signal obtained after beamforming from the first communication device. The downlink reference signal after the beamforming is for example at least one of a cell reference signal after the beamforming and the channel state information reference signal after the beamforming.

Figure 25:
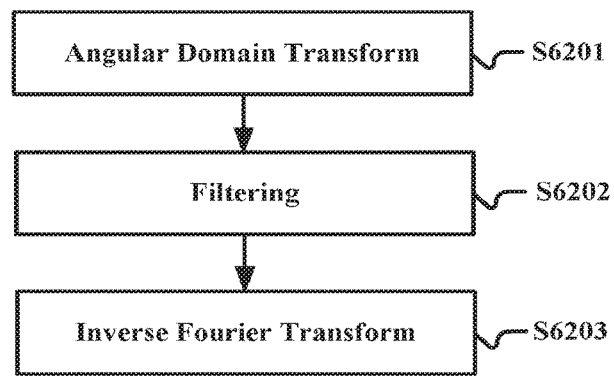
FIG. 25 is a flowchart showing sub steps of an example of step S62 in FIG. 24.

FIG. 25 is a flowchart showing the sub-steps of an example of performing filter based on the geographical location. As shown in FIG. 25, the sub-steps include: performing angular domain transform on the coarse estimation for the channel coefficients (S6201); performing filtering on the angular domain transform based on the direction described above (S6202); and performing inverse Fourier transform on a result obtained after the filtering to obtain a channel estimation result (S6203).

Specifically, in step S6202, an angle corresponding to a maximum value of the angular domain transform is taken as preliminary estimation, and a band-pass filter centered on the preliminary estimation is used to perform the filtering. The bandwidth of the filter based on the preliminary estimation can further be designed according to empirical values.

In addition, the sub-step b) in step S62 may be executed iteratively, that is, the channel estimation result acquired in step S6203 is taken as the coarse estimation for the channel coefficients, to further perform the filtering. In this way, the accuracy of the channel estimation can be further improved.

The signal described herein includes an uplink reference signal, for example a Sounding Reference Signal (SRS) or an uplink demodulation reference signal (DMRS).

Implementation for each step in the method has been described in detail in the third embodiment, the fourth embodiment and the description for the apparatus of the present embodiment, which is not repeated here any more.

Twelfth Embodiment

Figure 26:
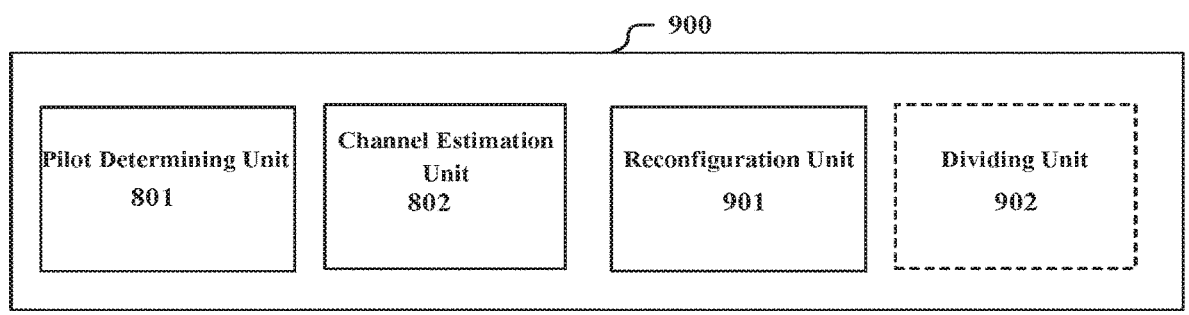
FIG. 26 is a structural block diagram showing an apparatus for wireless communication according to another embodiment of the present disclosure.

FIG. 26 is a structural block diagram showing an apparatus 900 for wireless communication according to another embodiment of the present disclosure. As shown in FIG. 26, besides the components in the apparatus 800, the apparatus 900 further includes a reconfiguration unit 901 configured to reconfigure, based on the geographical location of the first communication device and a geographical location of another communication device to which an uplink pilot sequence has been allocated, an uplink pilot sequence for the first communication device, to enable two or more communication devices within a same cell to multiplex non-orthogonal uplink pilot sequences.

Specifically, in a case that the first communication device requests to access into a cell where the apparatus 900 is located, the pilot determining unit 801 allocates an initial first uplink pilot sequence for the first communication device, and the channel estimation unit 802 estimates a geographical location of the first communication device based on a signal carrying the first uplink pilot sequence upon receiving the signal, performs spatial filtering during the channel estimation based on the geographical location to acquire a more accurate channel estimation result. The reconfiguration unit 903 may reallocate an uplink pilot sequence for the first communication device, based on the geographical location described above and a geographical location of another communication device to which an uplink pilot sequence has been allocated. For example, the reallocated uplink pilot sequence is the same as or is correlated to an uplink pilot sequence which is being used by a communication device within the same cell. Mutual interferences between the communication devices can be avoided by performing the spatial filtering during the channel estimation, and therefore, spatial multiplexing for the pilot sequence within the cell can be realized.

In the example, the channel estimation unit 802 is configured to acquire the geographical location of the first communication device and perform the channel estimation. In an aspect, the reconfiguration unit 902 may reconfigure the first uplink pilot sequence allocated to the first communication device based on the geographical location and the geographical location of another communication device to which an uplink pilot sequence has been allocated. In another aspect, the base station can receive and demodulate the signal based on the channel estimation result, and so on.

An example of the structure and function of the channel estimation unit 802 has been described in detail in the eleventh embodiment, which is not repeated here.

In an example, the pilot determining unit 802 is configured to determine a first uplink pilot sequence orthogonal to the uplink pilot sequence of another communication device to which the uplink pilot sequence has been allocated for the first communication device. For example, the pilot determining unit 801 may operate when the first communication device is initially accessed. In addition, the pilot determining unit 801 may determine the first uplink pilot sequence in the way described in the first embodiment.

In addition, in a case that the first communication device is in mobile state, for example, the channel estimation unit 802 may estimate a change in the location of the first communication device, and the reconfiguration unit 901 adjusts, based on a change in a location of the first communication device with respect to the geographical location of another communication device to which the uplink pilot sequence has been allocated, the uplink pilot sequence allocated for the first communication device.

For example, a non-orthogonal uplink pilot sequence (the same uplink pilot sequence or a correlated uplink pilot sequence) (referred as the second uplink pilot sequence) can be multiplexed by the first communication device with a second communication device to which an uplink pilot sequence is allocated. The location of the second communication device is greatly different from the location of the first communication device. In a case that the location of the first communication device is characterized by a direction (for example, an angle of arrival direction of a signal) of the first communication device with respect to the apparatus 900, for example, an angle of arrival direction of the first communication device is greatly different from an angle of arrival direction of the second communication device.

In a case that the reconfiguration unit 901 configures the first communication device and the second communication device to multiplex the second uplink pilot sequence, the channel estimation unit 802 performs channel estimation on the first communication device based on a received signal carrying the second uplink pilot sequence. Similarly, the filtering is perform during the channel estimation based on the geographical location of the first communication device. Since the location of the first communication device is greatly different from the location of the second communication device, interferences from the second communication device can be filtered out, and an accurate channel estimation result can also be acquired. In other words, the apparatus 900 enables communication devices in the same cell to spatially multiplex the correlated uplink pilot sequences.

Correspondingly, in a case that the location of the first communication device is close to the location of the second communication device, the reconfiguration unit 901 configures uplink pilot sequences which are orthogonal to each other for the first communication device and the second communication device respectively.

For example, the signal described above may include an uplink reference signal. An example of the uplink reference signal includes but is not limited to SRS and uplink DMRS. Operations of estimating the geographical location of the communication device and performing channel estimation while considering the spatial filtering have been described in detail in the eleventh embodiment, which is not repeated here any more.

In addition, as shown in a dashed-line block in FIG. 26, the apparatus 900 may further include a dividing unit 902 configured to divide a cell where the apparatus is located into multiple cell partitions. The reconfiguration unit 901 is configure to reconfigure an uplink pilot sequence for the first communication device, so that uplink pilot sequences of all communication devices within the same cell partition are orthogonal to each other.

Since geographical locations of communication devices within the same cell partition are close to each other the reconfiguration unit 901 allocates uplink pilot sequences which are orthogonal to each other for the communication devices within the same cell partition, to avoid mutual interference between the communication devices. In addition, in order to further ensure the communication quality, the reconfiguration unit 901 is further configured to reconfigure an uplink pilot sequence for the first communication device, so that the uplink pilot sequences of all communication devices within adjacent cells are orthogonal to each other.

In the example, a pilot pattern may be allocated to each of the cell partitions in advance as described above. Alternatively, the pilot pattern nay not be allocated to each of the cell partitions in advance, and the reconfiguration unit 901 allocates the pilot pattern randomly as appropriate.

In summary, the apparatus 900 according to the embodiment enables the communication devices in the same cell to spatially multiplex the uplink pilot sequence, thereby supporting more communication devices.

In addition, it should be noted that although the apparatus 900 described above includes the channel estimation unit 802 configured to perform the channel estimation operation with the spatial filtering based on the geographical location, the channel estimation unit 802 is not necessary. For example, in a case that, the first communication device and the second communication multiplexes the non-orthogonal uplink pilot sequences differed greatly in location, for example, the first communication device and the second communication device are located at two opposite sides of the cell, respectively, mutual inference between the first communication device and the second communication are not generated even the spatial filtering based on the geographical location is not performed during the channel estimation. In other words, in this case, the reconfiguration unit 901 may allocate the non-orthogonal uplink pilot sequences for the first communication device and the second communication device based on their geographical location relationship.

In another aspect, although an example of estimating the geographical location of the first communication device based on the coarse estimation for the channel coefficients or a measurement result based on a reference signal obtained after beamforming is described in describing the apparatus 900 described above, the geographical location of the first communication device used by the reconfiguration unit 901 can be acquired in other ways.

In other words, an apparatus which enable two or more communication devices within a same cell to spatially multiplex the uplink pilot sequence is further provided in the present disclosure, which includes a reconfiguration unit 901 configured to reconfigure, based on a geographical location of the first communication device and a geographical location of another communication device to which an uplink pilot sequence has been allocated, an uplink pilot sequence for the first communication device, to enable two or more communication devices within a same cell to multiplex non-orthogonal uplink pilot sequences. The apparatus may preferably include the channel estimation unit described above. However, it should be understood that a way for realizing the spatial multiplexing is not limited to the specific example described in the embodiment described above.

The number of user equipments supported can be increased without changing the current pilot sequences by the multiplexing described above, thereby improving the utilization efficiency of the pilot sequences.

Similar to the first embodiment, the apparatus 900 may be located in each access point or on a base station side, and the apparatus 900 configures an uplink pilot sequence for a communication device within a service range of the apparatus 900. The communication device may be a user equipment such as a mobile terminal, a vehicle, an intelligent wearable device and the like. Also, the communication device may also be an infrastructure such as a small cell base station for providing service.

Figure 27:
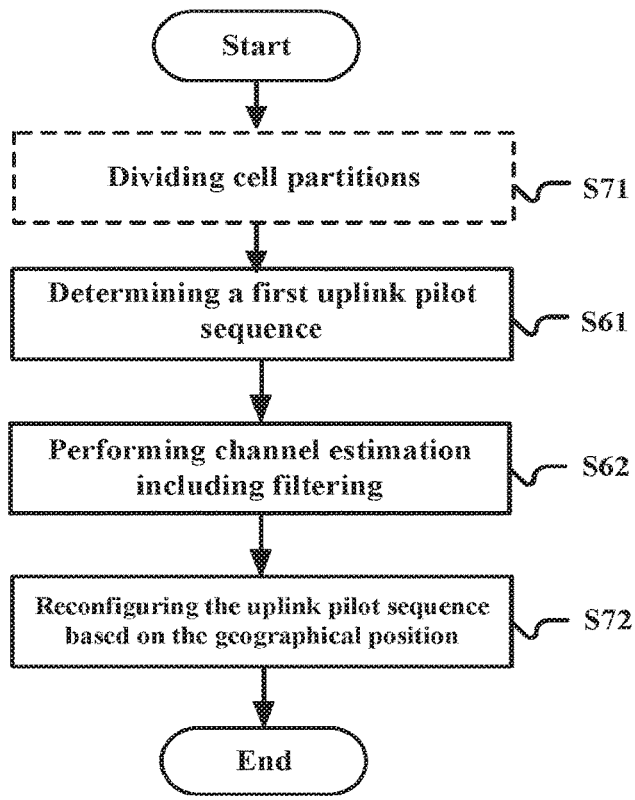
FIG. 27 is a flowchart showing a method for wireless communication according to another embodiment of the present disclosure.

Correspondingly, FIG. 27 is a flowchart showing a method for wireless communication according to an embodiment of the present disclosure. Besides steps S61 and S62 in FIG. 24, the method further includes step S72: reconfiguring, based on a geographical location of the first communication device and a geographical location of another communication device to which an uplink pilot sequence has been allocated, an uplink pilot sequence for the first communication device, to enable two or more communication devices within a same cell to multiplex non-orthogonal uplink pilot sequences.

In an example, in step S72, the non-orthogonal uplink pilot sequences are multiplexed by communication devices, locations of which are greatly different from each other. In step S61, a first uplink pilot sequence which is orthogonal to an uplink pilot sequence of another communication device to which the uplink pilot sequence has been allocated can be determined for the first communication device.

In addition, as shown in a dashed-line block in FIG. 27, the method described above may further include step S71: dividing a cell into multiple cell partitions. Specifically, an uplink pilot sequence is reconfigured for the first communication device in step S72, to enable uplink pilot sequences of all communication devices in a same cell partition to be orthogonal to each other. In an example, an uplink pilot sequence is reconfigured for the first communication device in step S72, to enable uplink pilot sequences of all communication devices within adjacent cell partitions to be orthogonal to each other.

The signal in the method described above includes an uplink reference signal, for example, a Sounding Reference Signal (SRS) or a demodulation reference signal (DMRS).

In addition, a method in which an uplink pilot sequence can be multiplexed spatially by two or more communication devices within a same cell is further provided according to the present disclosure, which includes: reconfiguring, based on a geographical location of the first communication device and a geographical location of another communication device to which an uplink pilot sequence has been allocated, an uplink pilot sequence for the first communication device, to enable two or more communication devices within a same cell to multiplex non-orthogonal uplink pilot sequences. The method may preferably include the channel estimation processing based on the spatial filtering described above.

Examples of each step and details thereof may refer to the description in the embodiments described above, which are not repeated here any more.

The technology of the present disclosure is applicable to various products. For example, the apparatus 400 and 500 may be realized as any type of server such as a tower server, a rack server, and a blade server. The apparatus 400 and 500 may be a control module (such as an integrated circuit module including a single die, and a card or a blade that is inserted into a slot of a blade server) mounted on a server.

For example, the apparatus 100-300 and 800 may be realized as any type of evolved Node B (eNB) such as a macro eNB and a small eNB. The small eNB may be an eNB such as a pico eNB, a micro eNB, and a home (femto) eNB that covers a cell smaller than a macro cell. Instead, the apparatus 100-300 and 800 may be realized as any other types of base stations such as a NodeB and a base transceiver station (BTS), the apparatus 100-300 and 800 may include a main body (that is also referred to as a base station apparatus) configured to control radio communication, and one or more remote radio heads (RRH) disposed in a different place from the main body. In addition, various types of terminals, which will be described below, may each operate as the the apparatus 100-300 and 800 by temporarily or semi-persistently executing a base station function.

For example, the electronic devices 600 and 700 may be realized as a mobile terminal such as a smartphone, a tablet personal computer (PC), a notebook PC, a portable game terminal, a portable/dongle type mobile router, and a digital camera, or an in-vehicle terminal such as a car navigation apparatus, the electronic devices 600 and 700 may also be realized as a terminal (that is also referred to as a machine type communication (MTC) terminal) that performs machine-to-machine (M2M) communication. Furthermore, the electronic devices 600 and 700 may be a radio communication module (such as an integrated circuit module including a single die) mounted on each of the terminals.

The basic principle of the present invention has been described above in conjunction with particular embodiments. However, as can be appreciated by those ordinarily skilled in the art, all or any of the steps or components of the method and device according to the invention can be implemented in hardware, firmware, software or a combination thereof in any computing device (including a processor, a storage medium, etc.) or a network of computing devices by those ordinarily skilled in the art in light of the disclosure of the invention and making use of their general circuit designing knowledge or general programming skills.

It can be understood by those skilled in the art that, in the apparatus described above, the location determining unit, the pilot determining unit, the channel estimation unit, the dividing unit, the pilot pattern generating unit and so on can be implemented by one or more processor, and the transmitting unit, the receiving unit, the informing interface and so on can be implemented by a circuit element such as an antenna, a filter, a modem, a codec and the like.

Therefore, an electronic device (1) is further provided in the present disclosure, which includes a circuit configured to: determine a cell partition corresponding to a geographical location of a communication device, each cell including multiple cell partitions; and determine an uplink pilot sequence corresponding to the cell partition as an uplink pilot sequence of the communication device.

An electronic device (2) is further provided in the present disclosure, which includes a circuit configured to: divide each of multiple cells into multiple cell partitions; and correspond multiple uplink pilot sequences to the multiple cell partitions to generate a pilot pattern, where the pilot pattern is generated based on pilot interferences between different cell partitions which are corresponding to a same uplink pilot sequence.

An electronic device (3) is further provided in the present disclosure, which includes a circuit configured to: determine, based on indicating information of the uplink pilot sequence allocated by a base station, an uplink pilot sequence of the electronic device; and determine a change in a geographical location of the electronic device, where in a case that the geographical locations of the electronic device before and after changing correspond to different cell partitions, the uplink pilot sequence of the electronic device is updated based on the indicating information of the uplink pilot sequence allocated by the base station, and the updated uplink pilot sequence correspond to the cell partition corresponding to the geographical location of the electronic device after changing.

An electronic device (4) is further provided in the present disclosure, which includes a circuit configured to: determine a first uplink pilot sequence for a first communication device; and perform, based on a received signal carrying the first uplink pilot sequence, channel estimation on the first communication device, where filtering is performed during the channel estimation based on a geographical location of the first communication device, to obtain a channel estimation result matching the first communication device.

Moreover, the present invention further discloses a program product in which machine-readable instruction codes are stored. The aforementioned methods according to the embodiments can be implemented when the instruction codes are read and executed by a machine.

Accordingly, a memory medium for carrying the program product in which machine-readable instruction codes are stored is also covered in the present invention. The memory medium includes but is not limited to soft disc, optical disc, magnetic optical disc, memory card, memory stick and the like.

In the case where the present application is realized by software or firmware, a program constituting the software is installed in a computer with a dedicated hardware structure (e.g. the general computer 2800 shown in FIG. 28) from a storage medium or network, wherein the computer is capable of implementing various functions when installed with various programs.

Figure 28:
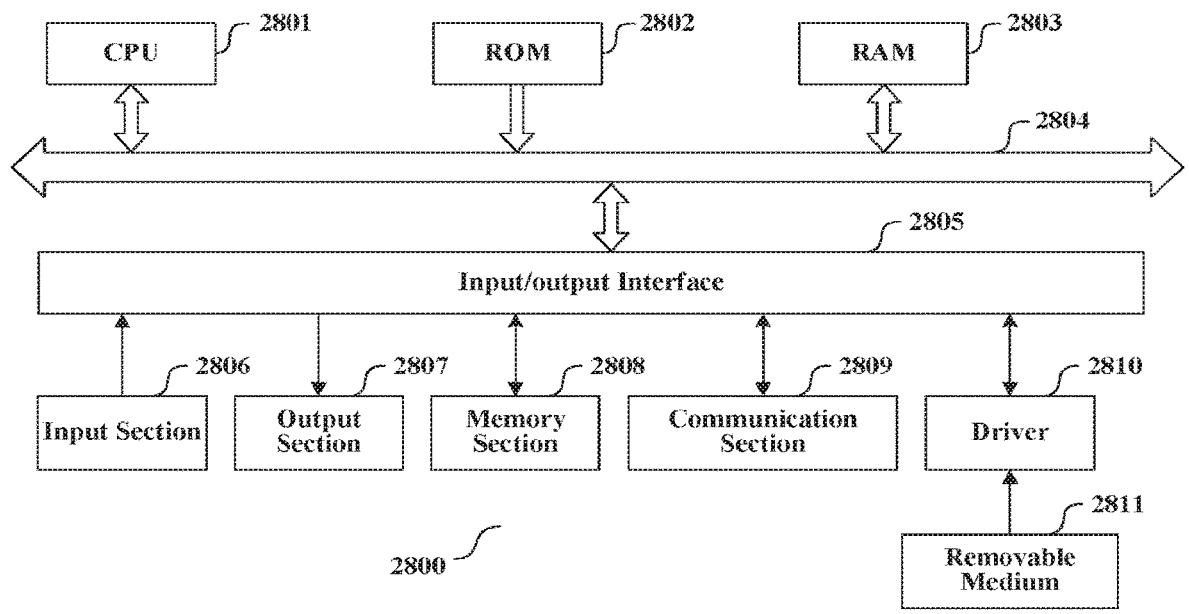
FIG. 28 is an exemplary block diagram illustrating the structure of a general purpose personal computer capable of realizing the method and/or device and/or system according to the embodiments of the present invention.

In FIG. 28, a central processing unit (CPU) 2801 executes various processing according to a program stored in a read-only memory (ROM) 2802 or a program loaded to a random access memory (RAM) 2803 from a memory section 2808. The data needed for the various processing of the CPU 2801 may be stored in the RAM 2803 as needed. The CPU 2801, the ROM 2802 and the RAM 2803 are linked with each other via a bus 2804. An input/output interface 2805 is also linked to the bus 2804.

The following components are linked to the input/output interface 2805: an input section 2806 (including keyboard, mouse and the like), an output section 2807 (including displays such as a cathode ray tube (CRT), a liquid crystal display (LCD), a loudspeaker and the like), a memory section 2808 (including hard disc and the like), and a communication section 2809 (including a network interface card such as a LAN card, modem and the like). The communication section 2809 performs communication processing via a network such as the Internet. A driver 2810 may also be linked to the input/output interface 2805. If needed, a removable medium 2811, for example, a magnetic disc, an optical disc, a magnetic optical disc, a semiconductor memory and the like, may be installed in the driver 2810, so that the computer program read therefrom is installed in the memory section 2808 as appropriate.

In the case where the foregoing series of processing is achieved the coarse software, programs forming the software are installed from a network such as the Internet or a memory medium such as the removable medium 2811.

It should be appreciated by those skilled in the art that the memory medium is not limited to the removable medium 2811 shown in Figure, which has program stored therein and is distributed separately from the apparatus so as to provide the programs to users. The removable medium 2811 may be, for example, a magnetic disc (including floppy disc (registered trademark)), a compact disc (including compact disc read-only memory (CD-ROM) and digital versatile disc (DVD), a magneto optical disc (including mini disc (MD) (registered trademark)), and a semiconductor memory. Alternatively, the memory medium may be the hard discs included in ROM 2802 and the memory section 2808 in which programs are stored, and can be distributed to users along with the device in which they are incorporated.

To be further noted, in the apparatus, method and system according to the invention, the respective components or steps can be decomposed and/or recombined. These decomlocations and/or recombinations shall be regarded as equivalent schemes of the invention. Moreover, the above series of processing steps can naturally be performed temporally in the sequence as described above but will not be limited thereto, and some of the steps can be performed in parallel or independently from each other.

Finally, to be further noted, the term "include", "comprise" or any variant thereof is intended to encompass nonexclusive inclusion so that a process, method, article or device including a series of elements includes not only those elements but also other elements which have been not listed definitely or an element(s) inherent to the process, method, article or device. Moreover, the expression "comprising a(n) . . . " in which an element is defined will not preclude presence of an additional identical element(s) in a process, method, article or device comprising the defined element(s)" unless further defined.

Although the embodiments of the invention have been described above in detail in connection with the drawings, it shall be appreciated that the embodiments as described above are merely illustrative but not limitative of the invention. Those skilled in the art can make various modifications and variations to the above embodiments without departing from the spirit and scope of the invention. Therefore, the scope of the invention is defined merely by the appended claims and their equivalents.

The invention claimed is:

1. An apparatus for wireless communication, comprising: circuitry configured to
determine a cell partition corresponding to a geographical location of a communication device, wherein each cell comprises a plurality of cell partitions;
determine an uplink pilot sequence corresponding to the cell partition as an uplink pilot sequence of the communication device;
receive a signal carrying a first uplink pilot sequence;
perform, based on the signal carrying the first uplink pilot sequence, channel estimation on a communication device to which the first uplink pilot sequence is allocated; and
perform, based on a geographical location of the communication device to which the first uplink pilot sequence is allocated, filtering during the channel estimation to obtain a channel estimation result matching the communication device to which the first uplink pilot sequence is allocated.

2. The apparatus according to claim 1, the circuitry is further configured to:
receive information indicating the geographical location transmitted by the communication device; and
transmit indicating information of the uplink pilot sequence to the communication device via a dedicated control signaling, to allocate the uplink pilot sequence to the communication device.

3. The apparatus according to claim 2, wherein adjacent cell partitions correspond to different uplink pilot sequences.

4. The apparatus according to claim 2, wherein the circuitry is further configured to receive information on an uplink pilot sequence for a cell partition of another cell adjacent to the cell partition where the communication device is located, and the circuitry is configured to determine, based on the information on the uplink pilot sequence for the cell partition of the another cell, the uplink pilot sequence corresponding to the cell partition where the communication device is located.

5. The apparatus according to claim 2, wherein the circuitry is further configured to receive, from a central node, pilot pattern information containing a correspondence between each cell partition and an uplink pilot sequence of the cell partition, and the pilot determining unit is configured to determine, based on the pilot pattern information, the uplink pilot sequence of the communication device.

6. The apparatus according to claim 1, wherein the geographical location of the communication device is characterized by at least one of an angle of arrival direction, an angle of arrival direction and a distance from the communication device to the apparatus, a geographical coordinate, and an ID of a small cell where the communication device is located.

7. The apparatus according to claim 1, wherein the circuitry is further configured to:
perform, based on the signal carrying the first uplink pilot sequence and the first uplink pilot sequence, coarse estimation on channel coefficients; and
perform, based on the geographical location of the communication device to which the first uplink pilot sequence is allocated, the filtering on the coarse estimation for the channel coefficients.

8. The apparatus according to claim 7, wherein the circuitry is configured to perform the filtering by performing discrete Fourier transform on the coarse estimation for the channel coefficients and windowing a result of the transform.

9. The apparatus according to claim 8, wherein the wireless communication is performed using an antenna array having a number of antennas and the circuitry is further configured to perform the discrete Fourier transform with a number of points that is greater than the number of antennas.

10. The apparatus according to claim 1, wherein, in a case that the circuitry determines that the geographical location of the communication device changes into another cell partition, the circuitry determines an uplink pilot sequence corresponding to the another cell partition as the uplink pilot sequence of the communication device.

11. The apparatus according to claim 1, wherein:
the circuitry includes memory circuitry configured to store a program and processing circuitry configured to execute the program to determine the cell partition corresponding to the geographical location of the communication device.

12. A method for wireless communication, comprising:
determining a cell partition corresponding to a geographical location of a communication device, wherein each cell comprises a plurality of cell partitions;
determining an uplink pilot sequence corresponding to the cell partition as an uplink pilot sequence of the communication device;
receiving a signal carrying a first uplink pilot sequence;
performing, based on the signal carrying the first uplink pilot sequence, channel estimation on a communication device to which the first uplink pilot sequence is allocated; and
performing, based on a geographical location of the communication device to which the first uplink pilot sequence is allocated, filtering during the performing of the channel estimation to obtain a channel estimation result matching the communication device to which the first uplink pilot sequence is allocated.

13. The method according to claim 12, further comprising:
   receiving information indicating the geographical location transmitted by the communication device; and
   transmitting indicating information of the uplink pilot sequence to the communication device via a dedicated control signaling, to allocate the uplink pilot sequence to the communication device.

14. The method according to claim 13, wherein adjacent cell partitions correspond to different uplink pilot sequences.

15. The method according to claim 13, further comprising:
   receiving information on an uplink pilot sequence for a cell partition of another cell adjacent to the cell partition where the communication device is located; and
   determining, based on the information on the uplink pilot sequence for the cell partition of the another cell, the uplink pilot sequence corresponding to the cell partition where the communication device is located.

16. The method according to claim 13, further comprising:
   receiving, from a central node, pilot pattern information containing a correspondence between each cell partition and an uplink pilot sequence of the cell partition; and
   determining, based on the pilot pattern information, the uplink pilot sequence of the communication device.

17. The method according to claim 12, wherein the geographical location of the communication device is characterized by at least one of an angle of arrival direction, an angle of arrival direction and a distance from the communication device, a geographical coordinate, and an ID of a small cell where the communication device is located.

18. The method according to claim 12, further comprising:
   performing, based on the signal carrying the first uplink pilot sequence and the first uplink pilot sequence, coarse estimation on channel coefficients; and
   performing, based on the geographical location of the communication device to which the first uplink pilot sequence is allocated, the filtering on the coarse estimation for the channel coefficients.

19. The method according to claim 18, wherein the filtering includes performing discrete Fourier transform on the coarse estimation for the channel coefficients and windowing a result of the transform.

20. The method according to claim 12, further comprising, in a case that the geographical location of the communication device is determined to change into another cell partition, determining an uplink pilot sequence corresponding to the another cell partition as the uplink pilot sequence of the communication device.

21. A non-transitory computer readable medium including instructions, which when executed by a processor in an electronic device, cause the processor to execute steps comprising:
   determining a cell partition corresponding to a geographical location of a communication device, wherein each cell comprises a plurality of cell partitions;
   determining an uplink pilot sequence corresponding to the cell partition as an uplink pilot sequence of the communication device;
   receiving a signal carrying a first uplink pilot sequence;
   performing, based on the signal carrying the first uplink pilot sequence, channel estimation on a communication device to which the first uplink pilot sequence is allocated; and
   performing, based on a geographical location of the communication device to which the first uplink pilot sequence is allocated, filtering during the performing of the channel estimation to obtain a channel estimation result matching the communication device to which the first uplink pilot sequence is allocated.

* * * * *